(12) United States Patent
Abe et al.

(10) Patent No.: US 7,711,655 B2
(45) Date of Patent: May 4, 2010

(54) ELECTRIC POWER TRADING SUPPORT SYSTEM

(75) Inventors: Keiko Abe, Mito (JP); Norimasa Nakata, Toride (JP); Mitsuo Tsurugai, Hitachinaka (JP); Takamasa Kiyono, Misato (JP); Takahiro Mochizuki, Yokohama (JP); Shinichiro Nakanami, Hitachi (JP); Shigeru Tamura, Hitachiota (JP); Noriyuki Murakoshi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1234 days.

(21) Appl. No.: 10/837,611

(22) Filed: May 4, 2004

(65) Prior Publication Data

US 2004/0254899 A1 Dec. 16, 2004

(30) Foreign Application Priority Data

May 8, 2003 (JP) ............................. 2003-129682

(51) Int. Cl.
*G06F 17/00* (2006.01)
*G06F 17/30* (2006.01)

(52) U.S. Cl. ........................................ 705/400; 705/10

(58) Field of Classification Search ................. 705/412, 705/400, 37, 26, 27, 7, 8, 10, 14; 700/286, 700/291, 297; 703/2, 3, 4, 18
See application file for complete search history.

(56) References Cited

U.S. PATENT DOCUMENTS

| | | | | |
|---|---|---|---|---|
| 5,479,358 | A * | 12/1995 | Shimoda et al. | 700/291 |
| 6,032,125 | A * | 2/2000 | Ando | 705/10 |
| 2002/0010754 | A1* | 1/2002 | Brown | 709/217 |
| 2002/0169657 | A1* | 11/2002 | Singh et al. | 705/10 |
| 2002/0191024 | A1* | 12/2002 | Huneycutt | 345/772 |
| 2003/0093332 | A1* | 5/2003 | Spool et al. | 705/26 |
| 2003/0189420 | A1 | 10/2003 | Hashimoto et al. | |
| 2004/0039490 | A1* | 2/2004 | Kojima et al. | 700/287 |
| 2004/0117236 | A1* | 6/2004 | Subramanian et al. | 705/10 |

FOREIGN PATENT DOCUMENTS

| | | |
|---|---|---|
| JP | 05-038048 | 2/1993 |
| JP | 05-204412 | 8/1993 |
| JP | 07-231569 | 8/1995 |

(Continued)

OTHER PUBLICATIONS

Council Demand Forecasting issues (2001); pp. 8.*

(Continued)

*Primary Examiner*—Igor Borissov
(74) *Attorney, Agent, or Firm*—Dickstein Shapiro LLP

(57) ABSTRACT

An electric power trading support system includes a demand prediction unit, a demand prediction error evaluation unit, a demand predicted value upward adjustment ratio (quantity) setting unit, a private power generation/power purchase ratio (quantities) setting unit, an optimization unit for evaluating optimum values of the demand predicted value upward adjustment ratio (quantity) and the self power generation/power purchase ratio (quantities) based on costs, and a display unit for displaying the optimum values evaluated by the optimization unit, maximizing profit to an electric power retailer by minimizing the cost for power generation and power purchase when the electric power retailer sells electric power by use of a private power generator and backup electric power purchased from an electric power company.

6 Claims, 18 Drawing Sheets

FOREIGN PATENT DOCUMENTS

| | | |
|---|---|---|
| JP | 08-202406 | 8/1996 |
| JP | 10-224990 | 8/1998 |
| JP | 2000-217253 | 8/2000 |
| JP | 2000-253583 | 9/2000 |
| JP | 2000-270473 | 9/2000 |
| JP | 2000276460 * | 10/2000 |
| JP | 2001-327074 | 11/2001 |
| JP | 2001-357237 | 12/2001 |
| JP | 2002-84661 | 3/2002 |
| JP | 2002-209335 | 7/2002 |
| JP | 2002-304443 | 10/2002 |
| JP | 2002-315191 | 10/2002 |
| JP | 02004274915 A * | 9/2004 |
| WO | WO-03/032463 A1 | 4/2003 |

OTHER PUBLICATIONS

Hsu et al. Applications of improved grey prediction model for power demand forecasting; 2002; pp. 9.*

Kyoritsu Shuppan Co., Ltd., Personal computer Statistic Handbook, vol. 2 (Multivariate Analysis), Sep. 5, 1984, pp. 1-7, 26-28.

* cited by examiner

FIG.4

GENERATION OF NEW ANALYSIS DATA SET

| DATA NAME | HITACHI LABORATORY | CONTRACT DEMAND | 8300 kW |
| ABBREVIATED DATA NAME | NIKKEN | DATA TYPE | ▼ OFFICE |

DEMAND DATA (DIRECTORY)
- ELECTRIC POWER: C:\Data\power\
- STEAM:

DEMAND CONDITION DATA (DIRECTORY)
- WEATHER: C:\Data\climate\
- EVENT: C:\Data\event\

ELECTRIC POWER PRICE DATA (FILE)
- POWER SALES PRICE: C:\Data\sell.csv
- POWER GENERATION COST: C:\Data\generate.csv
- BACKUP POWER PURCHASE COST: C:\Data\backup.csv
- LOAD FLUCTUATION/ CONNECTED SUPPLY COST: C:\Data\supply.csv

[RETURN]   [OK]   [END]

| ASSUMED DEMAND · POWER PURCHASE CONTRACT QUANTITY | | NEXT DAY PROFIT ANALYSIS | | NEXT DAY: 2003/02/05 | | |
|---|---|---|---|---|---|---|
| | | ▽ 12 OCLOCK | | PREDICTED VALUE OF DEMAND: 3425 kW | | |
| | | ACTUAL DEMAND AND ITS PROBABILITY | | STANDARD DEVIATION OF DEMAND: 27 kW | | |

| ACTUAL DEMAND / PROBABILITY | (a) PREDICTED VALUE -2SD | (b) PREDICTED VALUE -SD | (c) PREDICTED VALUE | (d) PREDICTED VALUE +SD | (e) PREDICTED VALUE +2SD | PROFIT EXPECTED VALUE FOR CONTRACT QTY. |
|---|---|---|---|---|---|---|
| ASSUMED PURCHASE CONTRACT QTY | 6.1 % | 24.2 % | 38.3 % | 24.2 % | 6.1 % | |
| | PROFIT (a) \| SALES QTY \| PRICE \| GENERATION QTY \| COST \| PURCHASE QTY \| COST | PROFIT (b) \| SALES QTY \| PRICE \| GENERATION QTY \| COST \| PURCHASE QTY \| COST | PROFIT (c) \| SALES QTY \| PRICE \| GENERATION QTY \| COST \| PURCHASE QTY \| COST | PROFIT (d) \| SALES QTY \| PRICE \| GENERATION QTY \| COST \| PURCHASE QTY \| COST | PROFIT (e) \| SALES QTY \| PRICE \| GENERATION QTY \| COST \| PURCHASE QTY \| COST | PROFIT (a) × PROBABILITY + PROFIT (b) × PROBABILITY + PROFIT (c) × PROBABILITY + PROFIT (d) × PROBABILITY + PROFIT (e) × PROBABILITY |
| PREDICTED VALUE -2SD | | | | | | |
| CONTRACT QTY.= ASSUMED DEMAND - MAX OUTPUT | | | | | | |
| PREDICTED VALUE -SD | | | | | | |
| CONTRACT QTY.= ASSUMED DEMAND - MAX OUTPUT | PROFIT (a) \| SALES QTY \| PRICE \| GENERATION QTY \| COST \| PURCHASE QTY \| COST | PROFIT (b) \| SALES QTY \| PRICE \| GENERATION QTY \| COST \| PURCHASE QTY \| COST | PROFIT (c) \| SALES QTY \| PRICE \| GENERATION QTY \| COST \| PURCHASE QTY \| COST | PROFIT (d) \| SALES QTY \| PRICE \| GENERATION QTY \| COST \| PURCHASE QTY \| COST | PROFIT (e) \| SALES QTY \| PRICE \| GENERATION QTY \| COST \| PURCHASE QTY \| COST | PROFIT (a) × PROBABILITY + PROFIT (b) × PROBABILITY + PROFIT (c) × PROBABILITY + PROFIT (d) × PROBABILITY + PROFIT (e) × PROBABILITY |
| PREDICTED VALUE | | | | | | |
| CONTRACT QTY.= ASSUMED DEMAND - MAX OUTPUT | | | | | | |
| PREDICTED VALUE +SD | | | | | | |
| CONTRACT QTY.= ASSUMED DEMAND - MAX OUTPUT | PROFIT (a) \| SALES QTY \| PRICE \| GENERATION QTY \| COST \| PURCHASE QTY \| COST | PROFIT (b) \| SALES QTY \| PRICE \| GENERATION QTY \| COST \| PURCHASE QTY \| COST | PROFIT (c) \| SALES QTY \| PRICE \| GENERATION QTY \| COST \| PURCHASE QTY \| COST | PROFIT (d) \| SALES QTY \| PRICE \| GENERATION QTY \| COST \| PURCHASE QTY \| COST | PROFIT (e) \| SALES QTY \| PRICE \| GENERATION QTY \| COST \| PURCHASE QTY \| COST | PROFIT (a) × PROBABILITY + PROFIT (b) × PROBABILITY + PROFIT (c) × PROBABILITY + PROFIT (d) × PROBABILITY + PROFIT (e) × PROBABILITY |

AXIS PARAMETER: FIXED / FREE

RETURN    OK    END

| ASSUMED DEMAND · POWER PURCHASE CONTRACT QUANTITY | | | NEXT DAY PROFIT ANALYSIS | | | NEXT DAY: 2003/02/05 | | |
|---|---|---|---|---|---|---|---|---|
| | | | ▽ 12 O'CLOCK | | | PREDICTED VALUE OF DEMAND: 3425 kW | | |
| | | | ACTUAL DEMAND AND ITS PROBABILITY | | | PREDICTED VALUE STANDARD DEVIATION OF DEMAND: 27 kW | | |
| ACTUAL DEMAND ASSUMED DEMAND PROBABILITY PURCHASE CONTRACT QTY | (a) PREDICTED VALUE -2SD 6.1% | (b) PREDICTED VALUE -SD 24.2% | (c) PREDICTED VALUE 38.3% | (d) PREDICTED VALUE +SD 24.2% | (e) PREDICTED VALUE +2SD 6.1% | PROFIT EXPECTED VALUE FOR CONTRACT QTY. | | PROBABILITY UN-ACHIEVABLE |
| PREDICTED VALUE -2SD CONTRACT QTY.= ASSUMED DEMAND - MAX OUTPUT | PROFIT (a) SALES QTY / PRICE GENERATION / COST PURCHASE QTY / COST | | | | | PROFIT (a) × PROBABILITY + PROFIT (b) × PROBABILITY + PROFIT (c) × PROBABILITY + PROFIT (d) × PROBABILITY + PROFIT (e) × PROBABILITY | | 83% |
| PREDICTED VALUE -SD CONTRACT QTY.= ASSUMED DEMAND - MAX OUTPUT | PROFIT (a) SALES QTY / PRICE GENERATION / COST PURCHASE QTY / COST | PROFIT (b) SALES QTY / PRICE GENERATION / COST PURCHASE QTY / COST | | | | | | 89% |
| PREDICTED VALUE CONTRACT QTY.= ASSUMED DEMAND - MAX OUTPUT | PROFIT (a) SALES QTY / PRICE GENERATION / COST PURCHASE QTY / COST | PROFIT (b) SALES QTY / PRICE GENERATION / COST PURCHASE QTY / COST | PROFIT (c) SALES QTY / PRICE GENERATION / COST PURCHASE QTY / COST | | | PROFIT (a) × PROBABILITY + PROFIT (b) × PROBABILITY + PROFIT (c) × PROBABILITY + PROFIT (d) × PROBABILITY + PROFIT (e) × PROBABILITY | | 30% |
| PREDICTED VALUE +SD CONTRACT QTY.= ASSUMED DEMAND - MAX OUTPUT | PROFIT (a) SALES QTY / PRICE GENERATION / COST PURCHASE QTY / COST | PROFIT (b) SALES QTY / PRICE GENERATION / COST PURCHASE QTY / COST | PROFIT (c) SALES QTY / PRICE GENERATION / COST PURCHASE QTY / COST | PROFIT (d) SALES QTY / PRICE GENERATION / COST PURCHASE QTY / COST | | | | 6% |
| PREDICTED VALUE +2SD CONTRACT QTY.= ASSUMED DEMAND - MAX OUTPUT | PROFIT (a) SALES QTY / PRICE GENERATION / COST PURCHASE QTY / COST | PROFIT (b) SALES QTY / PRICE GENERATION / COST PURCHASE QTY / COST | PROFIT (c) SALES QTY / PRICE GENERATION / COST PURCHASE QTY / COST | PROFIT (d) SALES QTY / PRICE GENERATION / COST PURCHASE QTY / COST | PROFIT (e) SALES QTY / PRICE GENERATION / COST PURCHASE QTY / COST | PROFIT (a) × PROBABILITY + PROFIT (b) × PROBABILITY + PROFIT (c) × PROBABILITY + PROFIT (d) × PROBABILITY + PROFIT (e) × PROBABILITY | | 1% |

1801

RETURN  OK  END

ELECTRIC POWER TRADING SUPPORT SYSTEM

INCORPORATION BY REFERENCE

The present application claims priority from Japanese application JP2003-129682 filed on May 8, 2003, the content of which is hereby incorporated by reference into this application.

BACKGROUND OF THE INVENTION

The present invention relates to an electric power trading support system to be used by electric power retailers (recently appearing since the deregulation or liberalization of the electric power industry) when the electric power retailer sells or supplies electric power generated by its own private electric generator to customers (customers demanding electric power) together with electric power (backup electric power) purchased from other suppliers (electric power company, electric power exchange/market, other electric power retailers, etc.), and in particular, to an electric power trading support system for letting the electric power retailer estimate and predict the demand of the electric power and evaluate, examine and optimize the planning of the ratio between the private power generation and the power purchase (backup power) or the quantities of them in order to increase the profit.

Until recently, electric power was generated by electric power companies only. In order to let the electric power companies plan operation schedules of power generators on the next day, various techniques for predicting electric power demand on the next day have been developed, in which prediction techniques employing a neural network, multiple linear regression analysis, etc. are well known.

Since electric power companies were the only provider of the electric power, fluctuation of the electric power demand on the day of power generation used to be taken care of by each electric power company, by adjusting the output level of its own power generators. In a method disclosed in JP-A-2002-84661 (hereinafter referred to as "patent document #1"), the amount of electric power to be generated by each power generator (or to be covered by each power purchase contract) for supplying sufficient electric power to the customers is determined starting from a power generator (or power purchase contract) of the lowest cost, under several conditions such as whether the demand/supply of each power generator (or the power purchase contract) can be adjusted on the day, minimum power generating capacity (or minimum power purchase quantity), etc.

In a method disclosed in JP-A-2001-327074 (hereinafter referred to as "patent document #2"), an electric power retailer gathers information on the demand of each customer by use of a network, predicts the electric power demand of the next day, and presents the result of the electric power demand prediction of the next day to each customer. Each customer is allowed to declare the amount of electric power to be used on the next day easily and precisely based on the electric power demand prediction result presented by the electric power retailer. In a method disclosed in JP-A-2002-315191 (hereinafter referred to as "patent document #3"), each customer is commissioned to predict its own electric power demand, and the electricity charges are changed depending on the accuracy of the prediction made by the customer.

Meanwhile, more and more electric power retailers are appearing in recent years since the deregulation of the electric power industry. The electric power retailer generates electric power by its own private power generator and supplies the generated electric power. If the electric power retailer owns a private power generator having a power generating capacity adapted to peak electric power demand, operating ratio of the private power generator remains low and the profits to the electric power retailer declines. Therefore, in peak hours, the electric power retailer purchases backup electric power (hereinafter, also referred to as "backup power") from an electric power company, an electric power exchange, another electric power retailer, an owner of a private power generator having surplus power, etc. Since storage of electric power is generally impossible and it is also difficult to rapidly increase/decrease (especially, rapidly increase) the amount of power generation, the electric power retailer who purchases the backup power has to previously report or declare expected quantities of hourly power purchase (demand) to the supplier of the backup power (electric power company, electric power exchange, another electric power retailer, etc.) prior to the day of power supply. However, if the actual demand deviates from the prediction (the prediction is off) and the electric power retailer uses too much backup power exceeding a threshold value (3% of the contract demand, for example), the electric power retailer has to pay an expensive penalty to the backup power supplier.

On the other hand, even if the quantity of backup power actually used is smaller than the declared power purchase quantity, the electric power retailer has to pay for the declared quantity. The power purchase contract includes such severe conditions that are characteristic of electric power.

The deviation of the actual demand from the prediction is inevitable. Paying the penalty to the backup power supplier can be avoided by estimating the demand a little higher and reporting a little larger power purchase quantity to the backup power supplier, or by setting the ratio of the private power generation at a low level so as to give a safety margin to the private power generator and let the power generator cope with the fluctuation of demand. However, in either case, a lot of the expensive backup power has to be purchased without making effective use of the private power generator which can generate electric power at a low unit cost. Therefore, profitability is necessitated to be deteriorated unless the ratio between the private power generation and the power purchase is set properly.

As described above, reduction of the cost for receiving the supply of the backup power is a critical issue for the electric power retailers.

SUMMARY OF THE INVENTION

It is therefore a first object of the present invention to provide an electric power trading support system capable of maximizing the profit to an electric power retailer by obtaining the following values for minimizing the cost for the power generation/purchase in cases where the electric power retailer retails the electric power by use of a private power generator and backup electric power purchased from a backup power supplier:

(A) optimum demand predicted value upward adjustment ratio (quantity)

(B) optimum self power generation/power purchase ratio (quantities)

In other words, the first object of the present invention is to provide a system that can obtain the optimum demand predicted value upward adjustment ratio and the optimum self power generation/power purchase ratio by which the deviation of the actual electric power demand from the previous day's prediction can be coped with by the output of the private power generator only, the expensive penalty (occurring when the usage of the backup power exceeded the threshold by 3% or more, for example) can be avoided, and the private power generator of the low cost can be used as much as possible.

A second object of the present invention is to provide a system that can grasp the change of the electric power demand caused by special events (bargain sale, exhibition, entertainment, etc. at a department store, for example) held by customers and thereby reduce the cost of the backup electric power.

Such special events as a bargain sale, exhibition and entertainment at a department store cause a significant change in the electric power demand. However, the predictor of the electric power demand (electric power retailer, for example), being unable to know when the customers will hold a special event or what kind it will be, is necessitated to predict that the demand will be as usual, by which the demand prediction can be off significantly. By such erroneous demand predictions, the electric power retailer has to pay an expensive penalty due to the demand that is far larger than usual or expectation, or the electric power retailer might purchase a lot of unnecessary backup power even though the actual demand is extremely small, resulting in deterioration of profitability.

If the customers previously and kindly informs the electric power retailer of upcoming events that can cause the change in the electric power demand, electric power demand prediction taking such events in consideration becomes possible. However, the customers, having nothing to do with the penalty to be paid by the electric power retailer and gaining nothing by reporting the upcoming events, do not take the trouble to inform the electric power retailer of such events, etc.

The second object of the present invention is, in other words, to provide a system that can induce the customers to (or let the customers have an incentive to) willingly inform the electric power retailer of upcoming events, by providing the system with: a unit for predicting fluctuation/variations in electric power demand of the customers caused by events held by the customers; a unit for acquiring information on the upcoming events from the customers; and a unit for calculating discounted electricity charges corresponding to the event information supplied from the customers, and predicting the electric power demand fluctuation/variations when the event information is supplied from the customers while calculating the discounted electricity charges corresponding to the supplied event information. By correct and precise prediction of the electric power demand fluctuation caused by events, the cost of the backup electric power can be reduced.

The method of the patent document #3 tries to give an incentive to the customers by commissioning the customers to carry out the demand prediction and changing the electricity charges depending on the accuracy of the demand prediction. However, many of general customers (department stores, hotels, offices, etc.) does not specialize in the analysis/prediction of their own electric power demand, and thus it is in many cases substantially difficult to let the customers carry out the demand prediction.

On the other hand, the system of the present invention is provided with the unit for predicting the electric power demand fluctuation caused by events held by the customers. Therefore, each customer benefits from willingly providing the event information to the electric power retailer since the customer can obtain a discount on the electricity charges only by informing the electric power retailer of upcoming events that can be relevant to the demand fluctuation. Also the predictor of the electric power demand (e.g. the electric power retailer) benefits from the event information supplied from the customers. By the presentation of the event information from the customers, the electric power retailer is allowed to analyze the relationship between the events and the demand fluctuation all by itself, by which the electric power retailer can predict demand corresponding to the event information precisely by use of its own up-to-date prediction technology and thereby reduce the backup cost. Incidentally, while the aforementioned system achieving the first object of the present invention can determine a backup contract (power purchase contract) that maximizes the profit even if there exists a demand prediction error, the profit can be more increased by reducing the original demand prediction error (the width of error distribution).

In order to achieve the first object of the present invention, it is necessary to obtain the following values that minimize the cost for the power generation and the power purchase:

(A) optimum demand predicted value upward adjustment ratio (quantity)

(B) optimum self power generation/power purchase ratio (quantities)

considering the cost of the private power generation using the private power generator, the cost of the power purchase from the backup power supplier (electric power company, etc.), and the penalty caused by the prediction error. For the estimation of the values, the following six units are necessary:

(1-1) unit for predicting the demand (1-2) unit for evaluating the demand prediction error (1-3) unit for setting a demand predicted value upward adjustment ratio (quantity)

(1-4) unit for setting a self power generation/power purchase ratio (quantities)

(1-5) unit for evaluating optimum values of the demand predicted value upward adjustment ratio (quantity) (1-3) and the self power generation/power purchase ratio (quantities) (1-4) based on costs (1-6) unit for displaying the optimum demand predicted value upward adjustment ratio (quantity) and the optimum self power generation/power purchase ratio (quantities)

In order to achieve the second object of the present invention, the following three units are necessary:

(2-1) unit for setting the relationship between information on events, production schedules, the number of people, etc. and the demand or demand fluctuation (2-2) unit for acquiring the information on events, production schedules, the number of people, etc. from the customers (2-3) unit for giving each customer a profit such as a discount on the electricity charges when the information on events, production schedules, the number of people, etc. is acquired from the customer The system of the present invention can be employed by an electric power retailer for increasing its own profit, by an electric power exchange for providing a service to the electric power retailers, by a factory (having power generating facilities such as a cogeneration power plant) for planning the operation schedule of the power generating facilities, etc.

BRIEF DESCRIPTION OF THE DRAWINGS

The objects and features of the present invention will become more apparent from the consideration of the following detailed description taken in conjunction with the accompanying drawings, in which:

FIG. 4 is a schematic diagram showing an example of a new analysis data set generation screen of the system of the embodiment;

FIG. 13 is a schematic diagram showing a "next day demand prediction" screen of the system of the embodiment;

FIG. 14 is a schematic diagram showing an example of a "next day profit analysis (backup power purchase contract optimization)" screen of the system of the embodiment;

FIG. 18 is a schematic diagram showing an example of a "next day profit analysis (backup power purchase contract optimization & same-time same-quantity unachievable analysis)" screen of the system of the embodiment;

DESCRIPTION OF THE EMBODIMENTS

Figure 1:
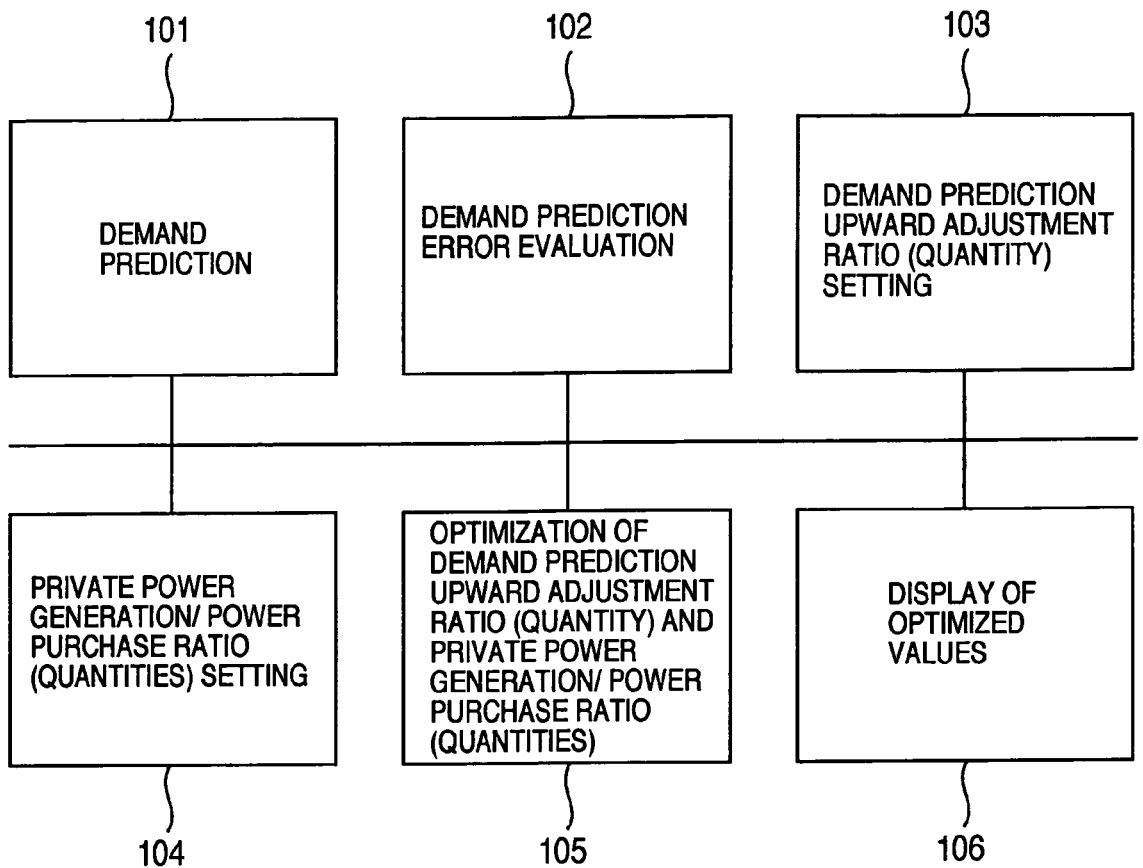
FIG. 1 is a block diagram showing functional blocks of an electric power trading support system in accordance with an embodiment of the present invention.

Referring now to the drawings, a description will be given in detail of preferred embodiments in accordance with the present invention.

Embodiment 1

FIG. 1 is a block diagram showing functional blocks of an electric power trading support system in accordance with a first embodiment of the present invention. The functional blocks of the system include a demand prediction unit 101, a demand prediction error evaluation unit 102, a demand prediction upward adjustment ratio (quantity) setting unit 103, a private power generation/power purchase ratio (quantities) setting unit 104, an optimization unit 105 for optimizing the demand prediction upward adjustment ratio (quantity) and the private power generation/power purchase ratio (quantities) based on costs, and a display unit 106 for displaying the optimized demand prediction upward adjustment ratio (quantity) and the optimized private power generation/power purchase ratio (quantities).

The demand prediction unit 101 predicts the demand for electric power, steam, etc.

The demand prediction error evaluation unit 102 evaluates how much prediction error is contained in the demand prediction result (demand predicted value) obtained by the demand prediction unit 101.

In consideration of an error contained in the demand prediction (demand predicted value), the demand prediction upward adjustment ratio (quantity) setting unit 103 sets an upward adjustment ratio (quantity) for the demand predicted value (that can avoid an expensive penalty in case of fluctuation in demand).

The private power generation/power purchase ratio (quantities) setting unit 104, also in consideration of the error contained in the demand prediction, determines the private power generation/power purchase ratio (quantities) (that can avoid an expensive penalty in case of demand fluctuation by output power adjustment of the private power generator, etc.).

The optimization unit 105 obtains optimum values of the demand prediction upward adjustment ratio (quantity) and the private power generation/power purchase ratio (quantities) based on cost information such as a price system of the power purchase (in which an expensive penalty occurs if the actual quantity of power purchase exceeds the power purchase contract quantity set on the previous day (especially if the actual power purchase quantity exceeds a preset threshold)), cost of private power generation and unit price of the power purchase. Here, the "optimum" means that high profit is expected from the values and the profit will be within a permissible range even when it is low.

The display unit 106 displays the optimum values of the demand prediction upward adjustment ratio (quantity) and the private power generation/power purchase ratio (quantities) obtained by the optimization unit 105.

Figure 2:
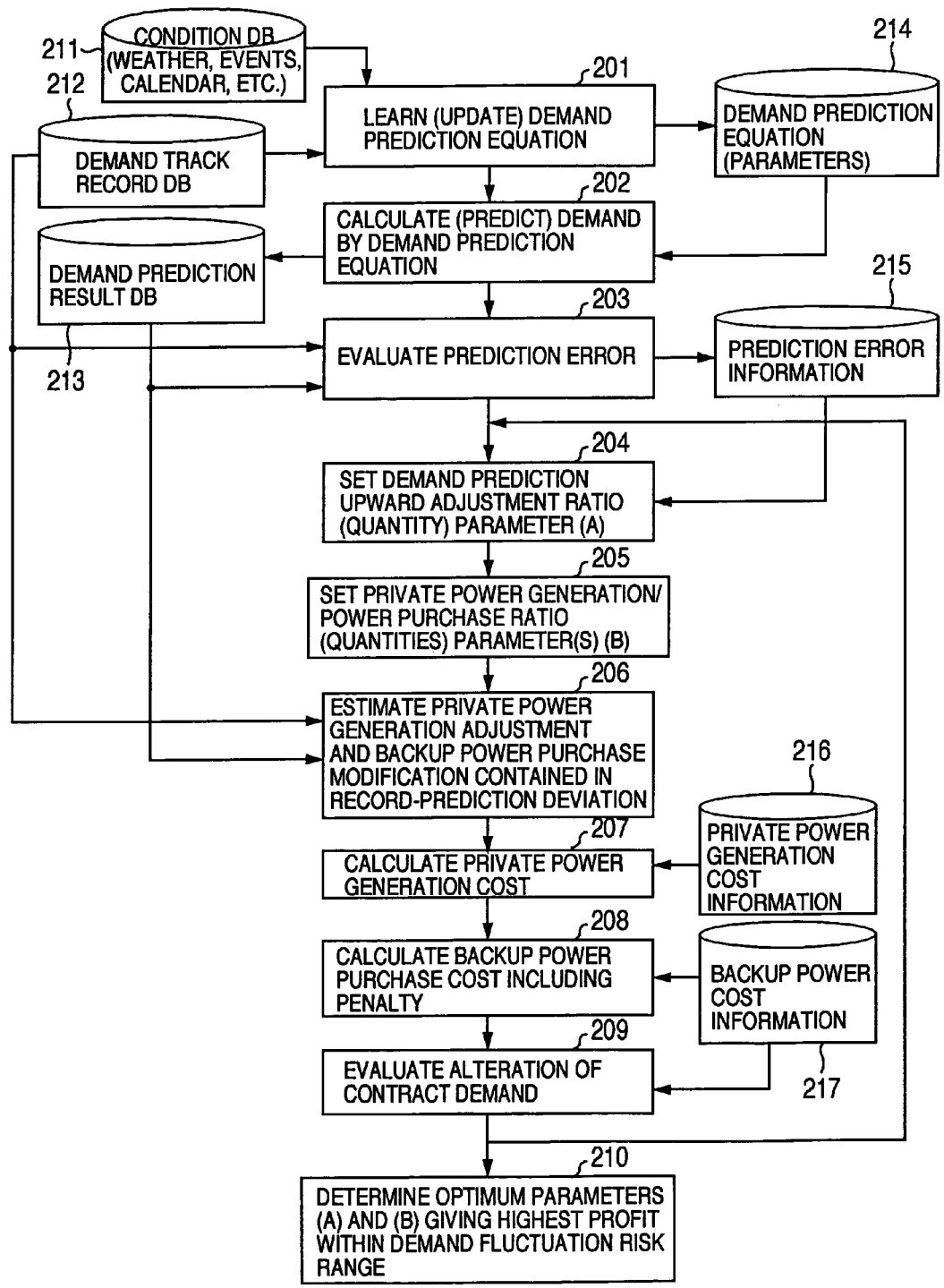
FIG. 2 is a flow chart showing a detailed process flow of the electric power trading support system in accordance with the embodiment.

Detailed process flow will be explained referring to FIG. 2. FIG. 2 is a flow chart showing a detailed process flow of the electric power trading support system in accordance with the first embodiment of the present invention. First, information relevant to the fluctuation of demand of the electric power, steam, etc. (temperature, events, etc.) is read out from a condition DB (weather, events, calendar, etc.) 211 and information on a track record of the demand of the customers is read out from a demand track record DB 212. By use of the information read out from the condition DB 211 and the demand track record DB 212, a demand prediction equation (parameters) 214 is learned (or updated) and the latest demand prediction equation (parameters) 214 is stored in memory (S201). Subsequently, demand (according to the demand prediction equation) is calculated by use of the demand prediction equation (parameters) 214 and the obtained demand (demand predicted value) is stored in a demand prediction result DB 213 (S202). Subsequently, data stored in the demand track record DB 212 and the demand prediction result DB 213 are read out, by which the prediction error of the demand predicted value (demand prediction error) is evaluated and the prediction error information 215 is stored in memory (S203). Subsequently, a proper demand prediction upward adjustment ratio (quantity) parameter is set by reference to the prediction error information 215 (S204). Further, a private power generation/power purchase ratio (quantities) parameter(s) (indicating the ratio between the private power generation quantity and the backup power purchase quantity contained in the total demand (total supply)) is set properly (S205). Subsequently, out of the deviation of the track record from the prediction, adjustment made by the private power generation and modification of the backup power purchase quantity are estimated (S206), the cost of the private power generation is calculated based on the private power generation cost information 216 (S207), and the cost of the backup power purchase (including the penalty) is calculated based on the backup power cost information 217 (S208). Further, if the demand exceeds the predicted value or the contract demand constantly or frequently and alteration to the contract or contract demand is necessary for the next year, cost caused by the alteration is also evaluated (S209). The above steps S204 through S209 are carried out using a plurality of demand prediction upward adjustment ratio (quantity) parameters and private power generation/power purchase ratio (quantities) parameters, by which an optimum demand prediction upward adjustment ratio (quantity) parameter and an optimum private power generation/power purchase ratio (quantities) parameter(s) that give the highest profit within a demand fluctuation risk range are determined (S210).

The condition DB (weather, events, calendar, etc.) 211 may store various condition data that can be relevant to the demand fluctuation, such as: weather information (information on temperature (highest temperature, lowest temperature, average temperature, etc.), wind velocity, wind direction, humidity, weather (look of the sky), etc.); event information (information on grand sales, Valentine sales, Christmas sales, etc. of department stores and supermarkets, wedding ceremonies at hotels, events at halls, etc.); calendar information (information on holidays, festival days, days of the week, etc.); information on production schedules of factories; information on the number of hotel guests; etc. Incidentally, electric power demand for air conditioning (cooling and heating) is susceptible not only to actual temperature but also to people's feeling. For example, when the temperature has dropped considerably (e.g. by 5 degrees) from the previous day, people tend to feel very cold and are inclined to use heating systems. Thus, it is effective for the demand prediction to employ parameters representing people's feeling (e.g. temperature difference between the day and the previous day).

The demand track record DB 212 is a database for storing past records (track record) of the demand. The demand track record is stored at preset intervals (every 30 minutes, hourly, etc.). It is desirable that the demand track record includes data of every 30 minutes in cases where the previous-day offer (declaration) for purchasing electric power according to the backup contract (power purchase contract) is made by the electric power retailer for each 30-minute period (hourly data in cases where the previous-day offer is made for each 1-hour period). Incidentally, even when the demand track record includes hourly data only, data of every 30 minutes can be generated internally by, for example, properly weighting the data of previous/following hours and adding them together.

The learning (update) of the demand prediction equation (S201) can be carried out by, for example, analyzing the relationship between the maximum temperature and the electric power demand by means of simple linear regression analysis and then learning (storing) a relational expression (parameters) obtained by the analysis as the demand prediction equation (parameters) 214. Specifically, parameters A and B of a regression line (relational expression):

$$[\text{ELECTRIC POWER (DEMAND)}] = A \times [\text{MAX TEMP.}] + B$$

can be obtained by means of the least-squares method, and the obtained relational expression (parameters) can be stored as the demand prediction equation (parameters) 214. In the case where the previous-day offer of the power purchase according to the backup contract is made for each 1-hour period, it is desirable that the demand prediction equation (parameters) 214 is obtained and stored for every hour. In cases where the demand tendency varies depending on the day of the week (Sunday, Monday, Tuesday, etc.) as in an office, it is desirable that the demand prediction equation (parameters) be obtained after summarizing (pattern classification) data of days of the week having similar demand tendency. Incidentally, for details of the calculation of the regression line parameters by means of the least-squares method, see page 26 (description on a method for obtaining a regression line by the least-squares method) of Personal Computer Statistics Handbook (Kyoritsu Shuppan Co., Ltd. (Japan)), Vol. 1 (Basic Statistics), for example.

Other than the above method (analyzing the relationship between the maximum temperature and the electric power demand by means of simple linear regression analysis), the learning (update) of the demand prediction equation (S201) can also be carried out by, for example, analyzing the relationship among the maximum temperature, the difference between the maximum temperature of the day and the maximum temperature of the previous day, wind velocity and the electric power demand by means of multiple linear regression analysis and then learning (storing) a relational expression (parameters) obtained by the analysis as the demand prediction equation (parameters) 214. Specifically, parameters A, B, C and D of a relational expression:

$$[\text{ELECTRIC POWER (DEMAND)}] =$$
$$A \times [\text{MAX TEMP.}] + B \times [\text{THE DAY'S MAX TEMP.} - \text{PREVIOUS DAY'S MAX TEMP.}] + C \times [\text{WIND VELOCITY}] + D$$

are obtained, and the relational expression (parameters) are stored as the demand prediction equation (parameters) 214. For details of the calculation of the parameters, see page 1 (description on the multiple linear regression analysis) of Personal Computer Statistics Handbook (Kyoritsu Shuppan Co., Ltd. (Japan)), Vol. 2 (Multivariate Analysis), for example.

Other than the above methods (obtaining the demand prediction equation (parameters) by means of simple linear regression analysis or multiple linear regression analysis), the learning (update) of the demand prediction equation (S201) can also be carried out by various demand prediction methods: a method obtaining the electric power demand from information on temperature, events, etc. by use of a neural network; a method by means of data mining; a method simply taking the average of data of the past several days as the predicted value; etc. It is also possible to obtain a plurality of demand prediction equations (parameters) by the above demand prediction methods respectively and then select one of the methods that gives the smallest demand prediction error.

In the prediction error evaluation (S203), the prediction error is evaluated by comparing the value of the demand prediction result DB 213 (obtained from the demand prediction equation) with the value of the demand track record DB 212. The distribution, magnitude, etc. of the prediction error, such as the average of the prediction error (average of absolute error) and the standard deviation of the error distribution, are evaluated. An example of the prediction error can be:

$$PE1=([\text{DEMAND PREDICTION RESULT}]-[\text{ACTUAL DEMAND RECORD}])/[\text{CONTRACT DEMAND}]$$

which is easy to use when the percentage of the error to the contract demand is discussed. Other examples of the prediction error may include the following:

$$PE2=([\text{DEMAND PREDICTION RESULT}]-[\text{ACTUAL DEMAND RECORD}])/[\text{ACTUAL DEMAND RECORD}]$$

$$PE3=[\text{DEMAND PREDICTION RESULT}]-[\text{ACTUAL DEMAND RECORD}]$$

An average absolute prediction error (average of absolute values of the prediction errors), the standard deviation of the prediction error distribution, etc. can be used as indices representing the magnitude of the demand prediction error of the past.

In cases where the demand prediction results and the actual demand records (track records) are hourly data, the prediction error can be obtained for each hour. When the demand tendency varies day by day and can be classified into patterns, the prediction error may preferably be obtained for each pattern and for each hour. An average of the prediction errors (average of absolute errors) for each pattern and for each hour, a 24-hour average of the standard deviation of the error distribution for each pattern, a 24-hour average of all the patterns, etc. may also be obtained for reference.

The setting of the demand prediction upward adjustment ratio (quantity) parameter (S204) and the setting of the private power generation/power purchase ratio (quantities) parameter (S205) are carried out on the basis of the standard deviation of the demand prediction error distribution, etc. obtained as the prediction error information 215. If the demand prediction error distribution is normal distribution (Gaussian distribution), a range of the demand prediction error between [normal−3×standard deviation] and [normal+3×standard deviation] covers (contains) 99% of al the cases. The parameters are set (adjusted) so that the optimum demand prediction upward adjustment ratio (quantity) parameter and the optimum private power generation/power purchase ratio (quantities) parameter can be obtained within the range. Then, the evaluation by cost (optimization of the demand prediction upward adjustment ratio (quantity) parameter and the private power generation/power purchase ratio (quantities) parameter based on cost) is carried out (S206-S209). The steps S204-S210 are more clearly understood by reference to figures, therefore, the optimization of the demand prediction upward adjustment ratio (quantity) parameter and the private power generation/power purchase ratio (quantities) parameter will be explained in detail later referring to FIG. 14.

In the following, screens of a demand analysis & backup contract optimization system (electric power trading support system) in accordance with the present invention will be explained with reference to FIG. 3 through FIG. 14.

Figure 3:
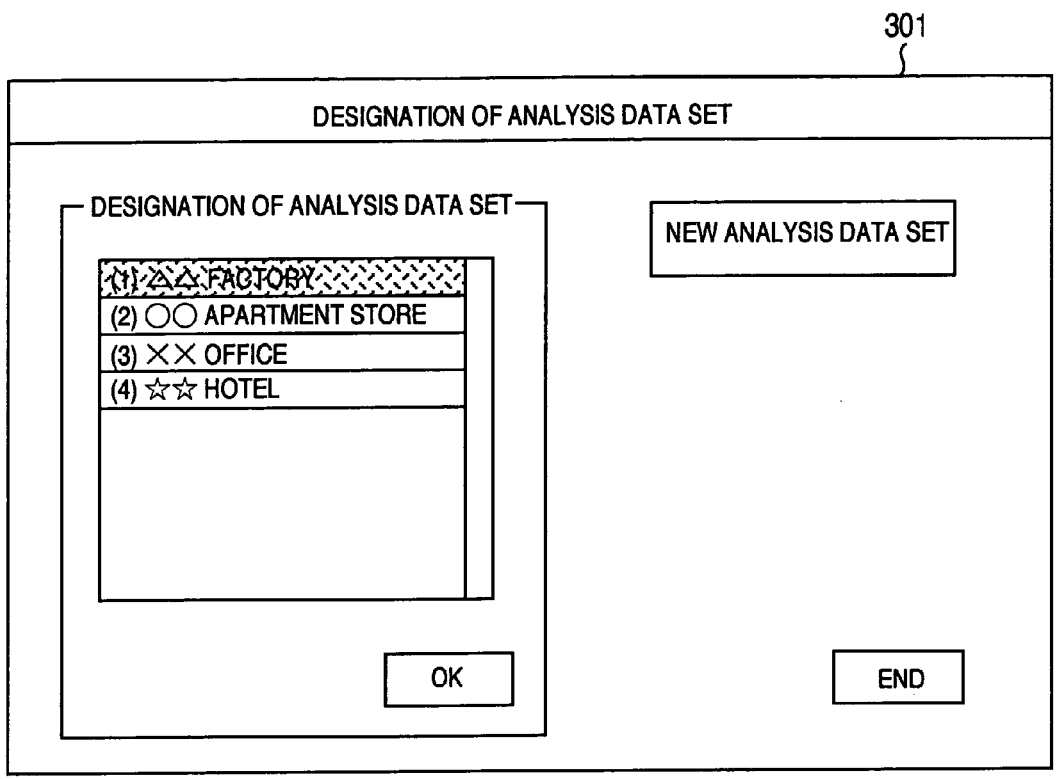
FIG. 3 is a schematic diagram showing an example of an analysis data set designation screen of the system of the embodiment.

FIG. 3 is a schematic diagram showing a screen initially displayed by the system. The screen includes a button for designating an analysis data set and a button for opening another screen for generating a new analysis data set. The "analysis data set" means information for managing data used for the demand prediction and cost calculation (condition DB 211, demand track record DB 212, private power generation cost information 216, backup power cost information 217, etc.) in a lump. By the management of the data for the demand prediction and cost calculation in a lump, operations repeatedly (daily) made for the demand analysis/backup contract optimization can be made simpler and easier. When the "NEW ANALYSIS DATA SET" button is selected, a screen shown in FIG. 4 is displayed, on which a data set to be used for the demand prediction and cost calculation is generated. Incidentally, when an already-generated analysis data set is selected from the menu on the left-hand side, a screen like the one shown in FIG. 4 is displayed as a data confirmation screen.

FIG. 4 is a schematic diagram showing a screen for generating an analysis data set. On the screen, data to be used for the demand prediction and cost calculation, such as data name, abbreviated data name, contract demand, data type, (directories of data files of) demand data of the electric power and steam, (directories of data files of) demand condition data (weather data and event data which are relevant to the demand fluctuation), and electric power price data (power sales price, power generation cost, backup power purchase cost, load fluctuation/connected supply cost, etc.) are managed in a lump as a data set.

The demand data of the electric power and steam are demand track record data of the electric power and steam of the past (for example, demand data of the past that have been measured every 30 minutes or every hour). Data of every 30 minutes are preferable in cases where the previous-day offer (declaration of expected demand) for purchasing the backup power according to the power purchase contract has to be made for each 30-minute period (hourly data in cases where the previous-day offer has to be made for each 1-hour period). Incidentally, it is also possible to generated data of every 30 minutes from the hourly data, as mentioned before. The demand data is, for example, CSV (Comma Separated Value) data in which hourly demand on days in the past is recorded. When there are two or more files corresponding to two or more periods of time, for example, each file can be designated by the name of the directory that stores the data (file). The demand data of the steam may be omitted when the demand prediction of steam is unnecessary.

The demand condition data is data relevant to the increase/decrease (fluctuation) of the demand, such as weather data and event data. In this example, the demand condition data is composed of weather data and event data.

The weather data includes weather information relevant to the electric power demand fluctuation (temperature (highest temperature, lowest temperature, average temperature, etc.), wind velocity, wind direction, humidity, weather (look of the sky), temperature difference from the previous day, etc.) described together with the date (month/day/year) in the past, as mentioned before. In this example, the weather data is CSV data containing the date (month/day/year), temperature (highest temperature, lowest temperature, average temperature, etc.), wind velocity, wind direction, humidity, weather (look of the sky), temperature difference from the previous day, etc. The weather data is used for studying the relationship between the weather data and the electric power (steam) demand data in order to predict the demand.

The event data is information on events that can be relevant to the demand fluctuation (information on grand sales, Valentine sales, Christmas sales, etc. of department stores and supermarkets, wedding ceremonies at hotels, events at halls, etc.), as mentioned before. In the event data, the type of event held on a day is described together with the date (month/day/year) of the day. Similar events may be registered as events of the same name (special A, special B, etc.), by which the classification of the demand data becomes easier.

The electric power price data is composed of power sales price, power generation cost, backup power purchase cost, load fluctuation/connected supply cost, etc. The power sales price (power sales price data) is data (equation, parameters, etc.) for calculating the price of the electric power when the electric power retailer supplies (sells) the electric power to the customers. The power sales price generally includes a base price (which is charged corresponding to contract demand) and a usage-based price (which is charged corresponding to the amount of electricity used). The power generation cost (power generation cost data) is data (equation, parameters, etc.) for calculating the cost of power generation by use of the private power generator (calculating the cost per kWh based on the output power, for example).

The backup power purchase cost (backup power purchase cost data) and the load fluctuation/connected supply cost (load fluctuation/connected supply cost data) are data for calculating the power purchase cost. The backup power purchase cost data contains data specifying an equation, parameters, etc. for calculating power purchase cost corresponding to the offer made on the previous day. The load fluctuation/connected supply cost data contains data specifying an equation, parameters, etc. for calculating consignment charge, the penalty in the case where the previous-day offer (prediction) is off, etc. In this explanation of the embodiment, the combination of the backup power purchase cost and the load fluctuation/connected supply cost is referred to as the "power purchase cost". Incidentally, in cases where the supplier of the backup power (electric power that has been planned to be used as backup) is different from a supplier of load fluctuation supporting power (electric power that is unscheduledly used due to major load fluctuation) or a supplier (consignor) of consigned electric power, for example, the costs may also be calculated separately.

By use of the data set explained above, the demand prediction equation is obtained and the cost calculation is carried out. When the "OK" button on the screen 401 is pressed (pressed or clicked, ditto for the following description), the display is switched into a main menu screen which is shown in FIG. 5.

Figure 5:
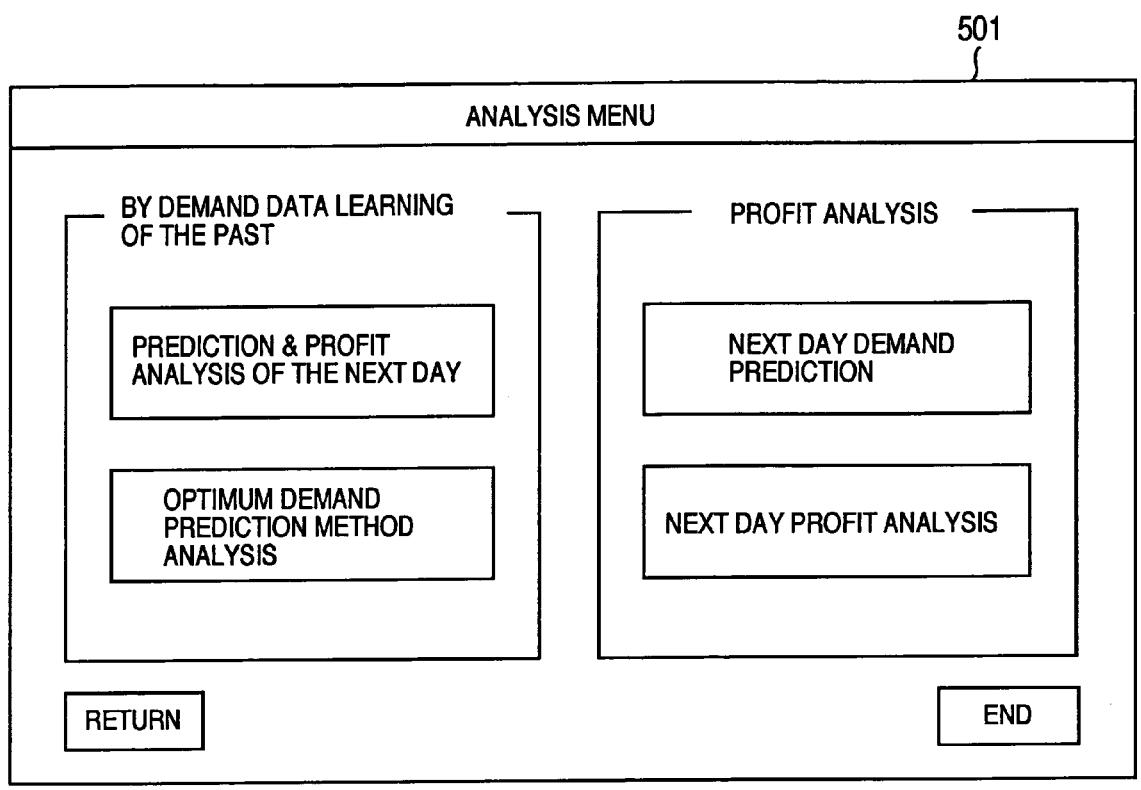
FIG. 5 is a schematic diagram showing an example of an analysis menu screen of the system of the embodiment.

FIG. 5 is a schematic diagram showing an "ANALYSIS MENU" screen 501 as the main menu of the system. The analysis menu has four menu items: "OPTIMUM DEMAND PREDICTION METHOD ANALYSIS" and "PROFIT ANALYSIS" in "BY DEMAND DATA LEARNING OF THE PAST", and "NEXT DAY DEMAND PREDICTION" and "NEXT DAY PROFIT ANALYSIS" in "PREDICTION & PROFIT ANALYSIS OF THE NEXT DAY". When the "OPTIMUM DEMAND PREDICTION METHOD ANALYSIS" by demand data learning of the past is selected, an "OPTIMUM DEMAND PREDICTION METHOD ANALYSIS" screen 601 shown in FIG. 6 is displayed.

Figure 6:
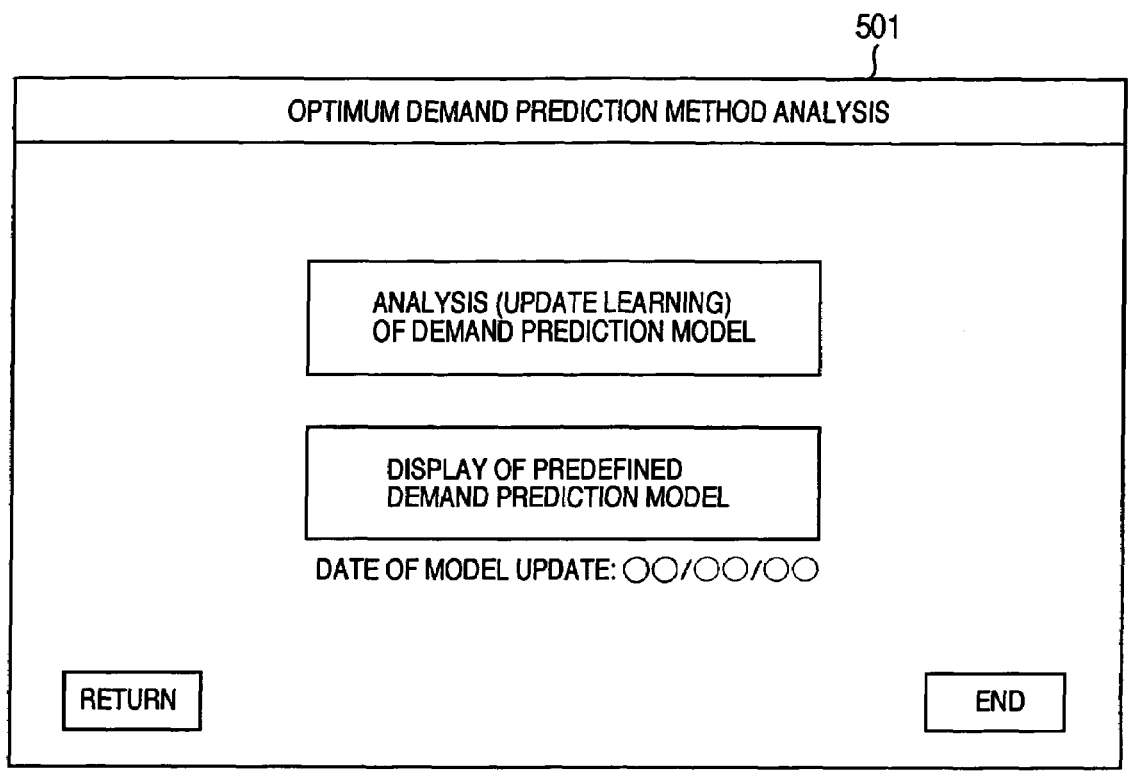
FIG. 6 is a schematic diagram showing an example of an optimum demand prediction method analysis screen of the system of the embodiment.

FIG. 6 is a schematic diagram showing the "OPTIMUM DEMAND PREDICTION METHOD ANALYSIS" screen 601. The "OPTIMUM DEMAND PREDICTION METHOD ANALYSIS" screen 601 has two menu items: "ANALYSIS (UPDATE LEARNING) OF DEMAND PREDICTION MODEL" and "DISPLAY OF PREDEFINED DEMAND PREDICTION MODEL". The "ANALYSIS (UPDATE LEARNING) OF DEMAND PREDICTION MODEL" is a menu item for conducting analysis and update learning of a demand prediction model by use of data of the past. The "DISPLAY OF PREDEFINED DEMAND PREDICTION MODEL" is a menu item for displaying an optimum demand prediction model which has already been obtained by the "ANALYSIS (UPDATE LEARNING) OF DEMAND PREDICTION MODEL". The item "DISPLAY OF PREDEFINED DEMAND PREDICTION MODEL" is provided to the menu in consideration of cases where a lot of prediction models are analyzed by the "ANALYSIS (UPDATE LEARNING) OF DEMAND PREDICTION MODEL" and an optimum prediction model is selected from the models, for example. In such cases, the analysis can take a very long time, therefore, the results of already executed analysis are saved in a record medium, and the existing analysis results can be instantly checked by the "DISPLAY OF PREDEFINED DEMAND PREDICTION MODEL". First, a case where the "ANALYSIS (UPDATE LEARNING) OF DEMAND PREDICTION MODEL" is selected will be explained below.

Figure 7:
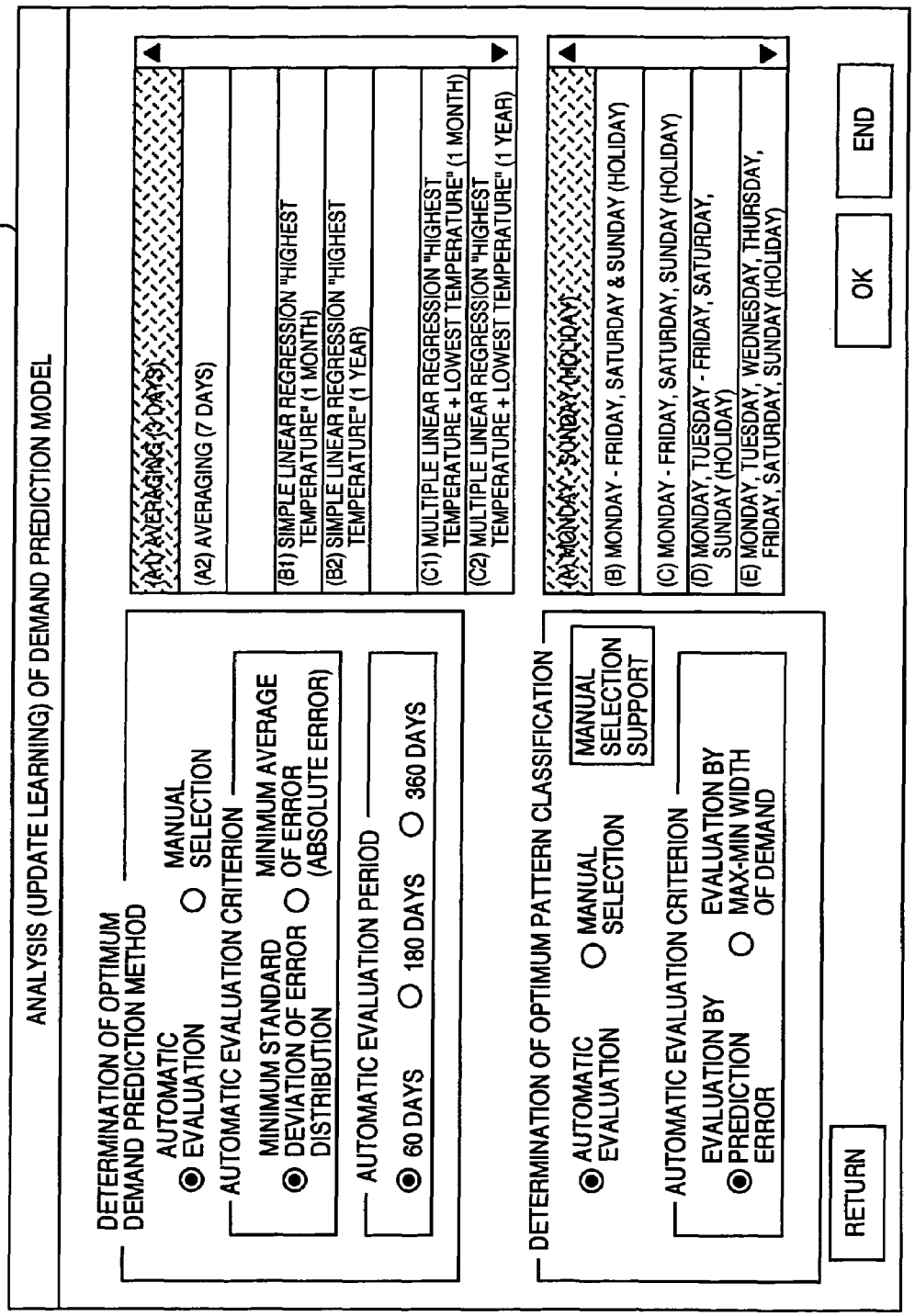
FIG. 7 is a schematic diagram showing an example of an "analysis (update learning) of demand prediction model" screen of the system of the embodiment.

FIG. 7 is a schematic diagram showing an "ANALYSIS (UPDATE LEARNING) OF DEMAND PREDICTION MODEL" screen 701, which is a screen used for determining a demand prediction model. In the "DETERMINATION OF OPTIMUM DEMAND PREDICTION METHOD" at the upper left of the screen, whether the optimum demand prediction method used by the system will be evaluated automatically ("AUTOMATIC EVALUATION") or selected manually ("MANUAL SELECTION") is determined. In this example, a plurality of demand prediction methods/parameters shown in the menu at the upper right of the screen are supported. The supported demand prediction methods/parameters include the following:

(A1) AVERAGING (3 DAYS): averaging of data of 3 days (A2) AVERAGING (7 DAYS): averaging of data of 7 days (B1) SIMPLE LINEAR REGRESSION "HIGHEST TEMPERATURE" (1 MONTH): simple linear regression of data of 1 month regarding highest temperature and electric power demand (B2) SIMPLE LINEAR REGRESSION "HIGHEST TEMPERATURE" (1 YEAR): simple linear regression of data of 1 year regarding highest temperature and electric power demand (C1) MULTIPLE LINEAR REGRESSION "HIGHEST TEMPERATURE+ LOWEST TEMPERATURE" (1 MONTH): multiple linear regression of data of 1 month regarding highest temperature, lowest temperature and electric power demand (C2) MULTIPLE LINEAR REGRESSION "HIGHEST TEMPERATURE+LOWEST TEMPERATURE" (1 YEAR): multiple linear regression of data of 1 year regarding highest temperature, lowest temperature and electric power demand The calculation of each demand prediction equation has been explained above in the description on the "LEARNING (UPDATE) OF THE DEMAND PREDICTION EQUATION (S201)" of FIG. 2. Whether to select an optimum prediction method from the demand prediction methods/parameters of the menu by the "AUTOMATIC EVALUATION" or the "MANUAL SELECTION" is selected by the user (operator). For the "AUTOMATIC EVALUATION", a criterion for the evaluation has to be set. Two options: "MINIMUM STANDARD DEVIATION OF ERROR DISTRIBUTION" and "MINIMUM AVERAGE OF ERROR (ABSOLUTE ERROR)" are prepared in a criterion menu, and a selection is made from the options. In the case of "AUTOMATIC EVALUATION", an evaluation period for evaluating the best (optimum) method/parameters is set. In this example, the automatic evaluation period is selected from an "AUTOMATIC EVALUATION PERIOD" menu.

Before the calculation of the demand prediction model (demand prediction equation (parameters)), data classification becomes necessary. For example, in the case of electric power demand of an office, daytime electricity usage differs between weekdays (Monday-Friday) and holidays. Even in holidays, Saturday and Sunday have different demand tendencies since there are some workers going to work on Saturday for finishing uncompleted tasks while there are few workers on Sunday. Thus, in the case where the demand prediction method "(A1) averaging (3 days)" is employed, average on each day of the week can not be obtained correctly if data of all the days of the week (Monday-Sunday) are mixed up. Therefore, it is necessary to previously classify the data into data groups having similar demand tendencies before the determination of the demand prediction equation or parameters. Therefore, the method for the pattern classification is determined by use of a "DETERMINATION OF OPTIMUM PATTERN CLASSIFICATION" menu at the lower left of the screen. The following generally used candidates of pattern classification regarding the days of the week are shown in a pattern classification candidate menu at the lower right of the screen (in which "," denotes the separator between patterns):

(A) MONDAY-SUNDAY (HOLIDAY)
(B) MONDAY-FRIDAY, SATURDAY & SUNDAY (HOLIDAY)
(C) MONDAY-FRIDAY, SATURDAY, SUNDAY (HOLIDAY)
(D) MONDAY, TUESDAY-FRIDAY, SATURDAY, SUNDAY (HOLIDAY)
(E) MONDAY, TUESDAY, WEDNESDAY, THURSDAY, FRIDAY, SATURDAY, SUNDAY (HOLIDAY)

In this example, whether to determine an optimum pattern classification from the pattern classification menu at the lower right of the screen by "AUTOMATIC EVALUATION" or "MANUAL SELECTION" is selected. In the case of "AUTOMATIC EVALUATION", the criterion for the automatic evaluation is selected from "EVALUATION BY PREDICTION ERROR" and "EVALUATION BY MAX-MIN WIDTH OF DEMAND". The "EVALUATION BY PREDICTION ERROR" is a method that determines the optimum pattern classification based on the prediction error together with the "DETERMINATION OF OPTIMUM DEMAND PREDICTION METHOD" (at the upper left of the screen). In other words, the optimum combination is selected from the combinations of pattern classification and demand prediction model/parameters ([the number of pattern classification candidates]×[the number of demand prediction model/parameters candidates]) based on the prediction error. In the "EVALUATION BY MAX-MIN WIDTH OF DEMAND", a pattern classification having the smallest Max-Min width of the demand at each hour is selected automatically.

When the "MANUAL SELECTION", instead of the "AUTOMATIC EVALUATION", is selected, the user needs information helpful in determining which pattern classification is suitable. Therefore, the user presses (presses or clicks, ditto for the following description) a "MANUAL SELECTION SUPPORT" button, by which a "MANUAL SELECTION SUPPORT" screen shown in FIG. 8 appears and information for supporting the user determining the suitable pattern classification is displayed.

Figure 8:
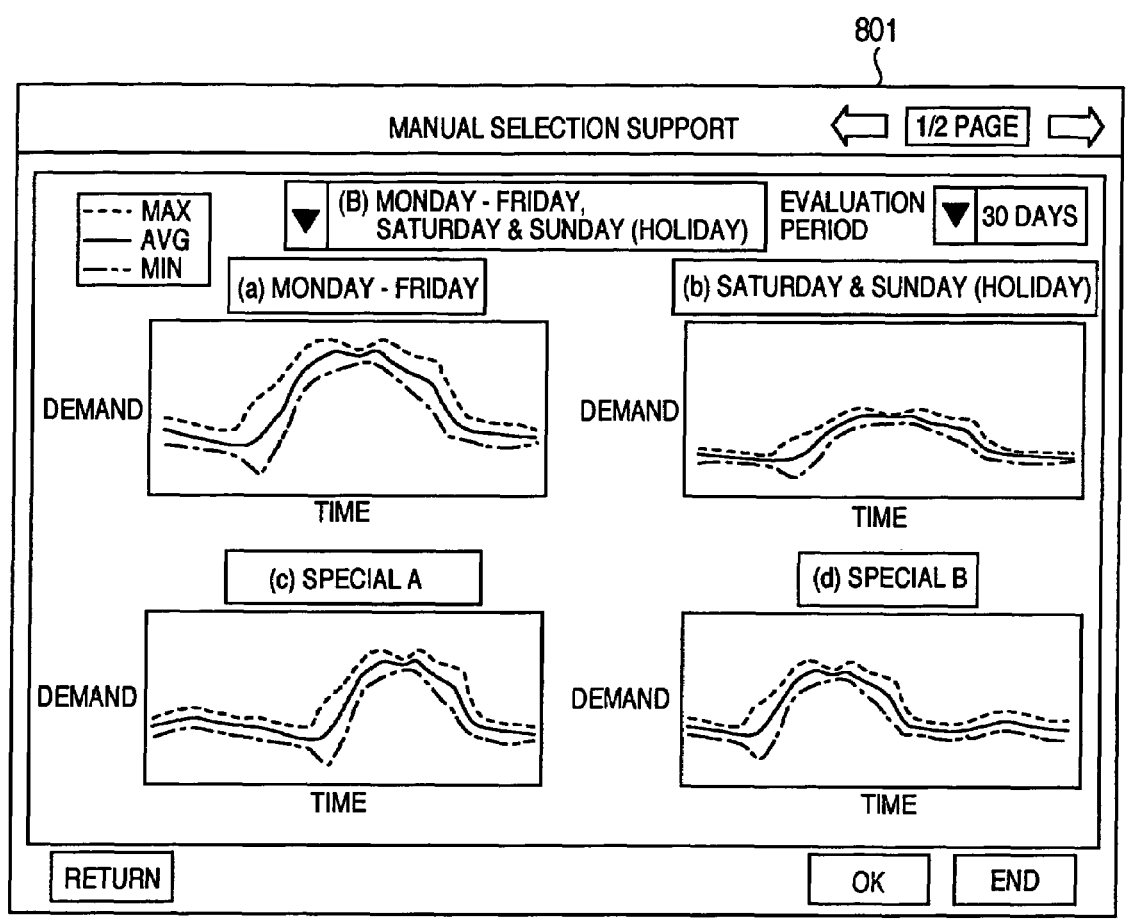
FIG. 8 is a schematic diagram showing an example of a (pattern classification) manual selection support screen of the system of the embodiment.

FIG. 8 is a schematic diagram showing the "MANUAL SELECTION SUPPORT" screen 801. The "MANUAL SELECTION SUPPORT" screen 801 displays information that helps the user visually judge which one of the pattern classifications gives the smallest Max-Min width of the demand at each hour. At the top center of the screen, a pattern classification type "(B) Monday-Friday, Saturday & Sunday (holiday)" is being displayed. The pattern classification type can be changed arbitrarily by selecting from the pattern classification types "(A) Monday-Sunday (holiday)"-"(E) Monday, Tuesday, Wednesday, Thursday, Friday, Saturday, Sunday (holiday)". Below the pattern classification type, graphs showing the maximum demand, average demand and minimum demand at each hour are displayed in regard to each pattern ((a) Monday-Friday, (b) Saturday & Sunday (holiday), (c) special A, (d) special B) corresponding to the pattern classification. If the pattern classification is suitable and successful, the Max-Min width of the demand becomes small at every hour in each pattern ((a), (b), (c), (d)). On the other hand, the Max-Min width of the demand at each hour becomes larger if different patterns are mixed up (mixing up (a) and (b) of FIG. 8, for example). Therefore, the user can select a pattern classification (type) showing small demand Max-Min widths in every pattern, by checking the demand Max-Min width of the graph of each pattern while successively switching the pattern classification type ((A)-(E)). Incidentally, the "(c) special A" and "(d) special B" are added as patterns of the classification "(B) Monday-Friday, Saturday & Sunday (holiday)", in order to consider the days of special events registered with the event information ((c) special A, (d) special B) in addition to the ordinary-demand day classification ((a) Monday-Friday, (b) Saturday & Sunday (holiday)). In other words, while the ordinary-demand day classification (type) is displayed in the menu, in the actual process, special-demand days registered with the event information ((c) special A, (d) special B), in addition to the ordinary-demand days, have to be data-classified before the calculation of the demand prediction equation (parameters).

When the optimum pattern classification is found out based on the graphs displayed on the screen of FIG. 8, the user presses the "OK" button with the optimum pattern classification being selected in the menu, by which the process returns to the screen 701 of FIG. 7.

In the "ANALYSIS (UPDATE LEARNING) OF DEMAND PREDICTION MODEL" screen 701 of FIG. 7, after making the selection in the "DETERMINATION OF OPTIMUM DEMAND PREDICTION METHOD" menu at the upper left of the screen and executing the "DETERMINATION OF OPTIMUM PATTERN CLASSIFICATION" at the lower left of the screen (by selecting the "AUTOMATIC EVALUATION" or executing the "MANUAL SELECTION" by use of the "MANUAL SELECTION SUPPORT" screen of FIG. 8), the user presses the "OK" button, by which the analysis (update learning) of the demand prediction model is carried out.

In the analysis (update learning) of the demand prediction model, a demand prediction equation (parameters) is calculated by use of the electric power (or steam) demand data and the demand condition data (weather/event information, etc.) designated on the screen of FIG. 4 by a method like the one explained in the "LEARNING (UPDATE) OF THE DEMAND PREDICTION EQUATION (S201)" of FIG. 2. In the calculation of the demand prediction equation (parameters), if the pattern classification has been selected manually ("MANUAL SELECTION"), the data is classified according to the pattern classification before the calculation of the demand prediction equation (parameters). Also in the case of the automatic classification ("AUTOMATIC EVALUATION"), when the classification by the "EVALUATION BY MAX-MIN WIDTH OF DEMAND" is carried out, a suitable pattern classification is previously selected from (A)-(E) based on the demand Max-Min width and data is classified according to the selected pattern classification before the calculation of the demand prediction equation (parameters). In the case where the optimum pattern classification is automatically evaluated ("AUTOMATIC EVALUATION") and the "EVALUATION BY PREDICTION ERROR" is selected as the automatic evaluation criterion, the optimum combination has to be selected from the combinations of pattern classification and demand prediction model/parameters ([the number of pattern classification candidates]×[the number of demand prediction model/parameters candidates]) based on the prediction error. Therefore, the data are classified by all classification methods and then the calculation of the demand prediction equation (parameters) is carried out. When the determination of the demand prediction equation ("DETERMINATION OF OPTIMUM DEMAND PREDICTION METHOD") is executed by the "AUTOMATIC EVALUATION", the prediction error is obtained by comparing a demand calculated by the demand prediction equation (parameters) with the actual demand data (track record data of the demand). When the "MINIMUM STANDARD DEVIATION OF ERROR DISTRIBUTION" is selected as the automatic evaluation criterion of the optimum demand prediction method in the menu of FIG. 7, a demand prediction equation (parameters) that gives the minimum (smallest) standard deviation of the error distribution is selected and determined as the optimum demand prediction equation (parameters). Meanwhile, when the "MINIMUM AVERAGE OF ERROR (ABSOLUTE ERROR)" is selected as the automatic evaluation criterion of the optimum demand prediction method in the menu of FIG. 7, a demand prediction equation (parameters) that gives the minimum (smallest) average of error (absolute error) is selected and determined as the optimum demand prediction equation (parameters). Incidentally, in the case where the demand prediction has to be carried out for each 1-hour period, the optimum demand prediction equation (parameters) is obtained for each hour. As the results of the analysis (update learning), screens shown in FIG. 9 and FIG. 10 are displayed.

Figure 9:
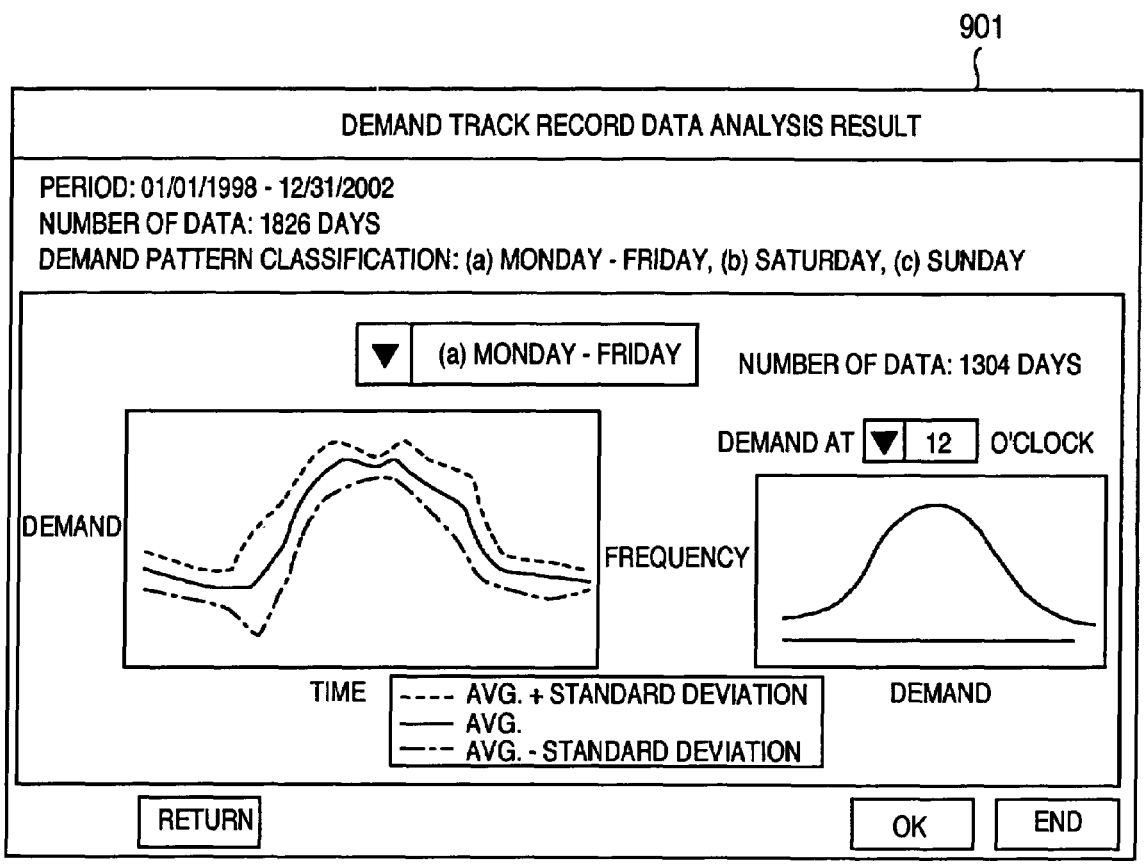
FIG. 9 is a schematic diagram showing an example of a demand track record data analysis result screen of the system of the embodiment.

FIG. 9 is a schematic diagram showing a "DEMAND TRACK RECORD DATA ANALYSIS RESULT" screen 901. On this screen 901, the outline of the demand data, such as the value/range of the electric power demand at each hour, is displayed. At the top of the screen, the period of time of the data analysis/evaluation, the number of data, and the selected demand pattern classification are displayed. In the lower part of the screen, a graph showing the relationship between time and demand is displayed in regard to each pattern. By displaying not only the average value of the demand but also values obtained by adding/subtracting the standard deviation (of the demand distribution at each hour) to/from the average demand in the graph as in FIG. 9, fluctuation/variation range of the demand, the time of day when the demand tends to fluctuate/vary, etc. be grasped clearly. Another graph on the right side shows the demand distribution at each hour in regard to each pattern of the selected demand pattern classification, by which the distribution of the demand at each hour can be grasped more in detail.

Figure 10:
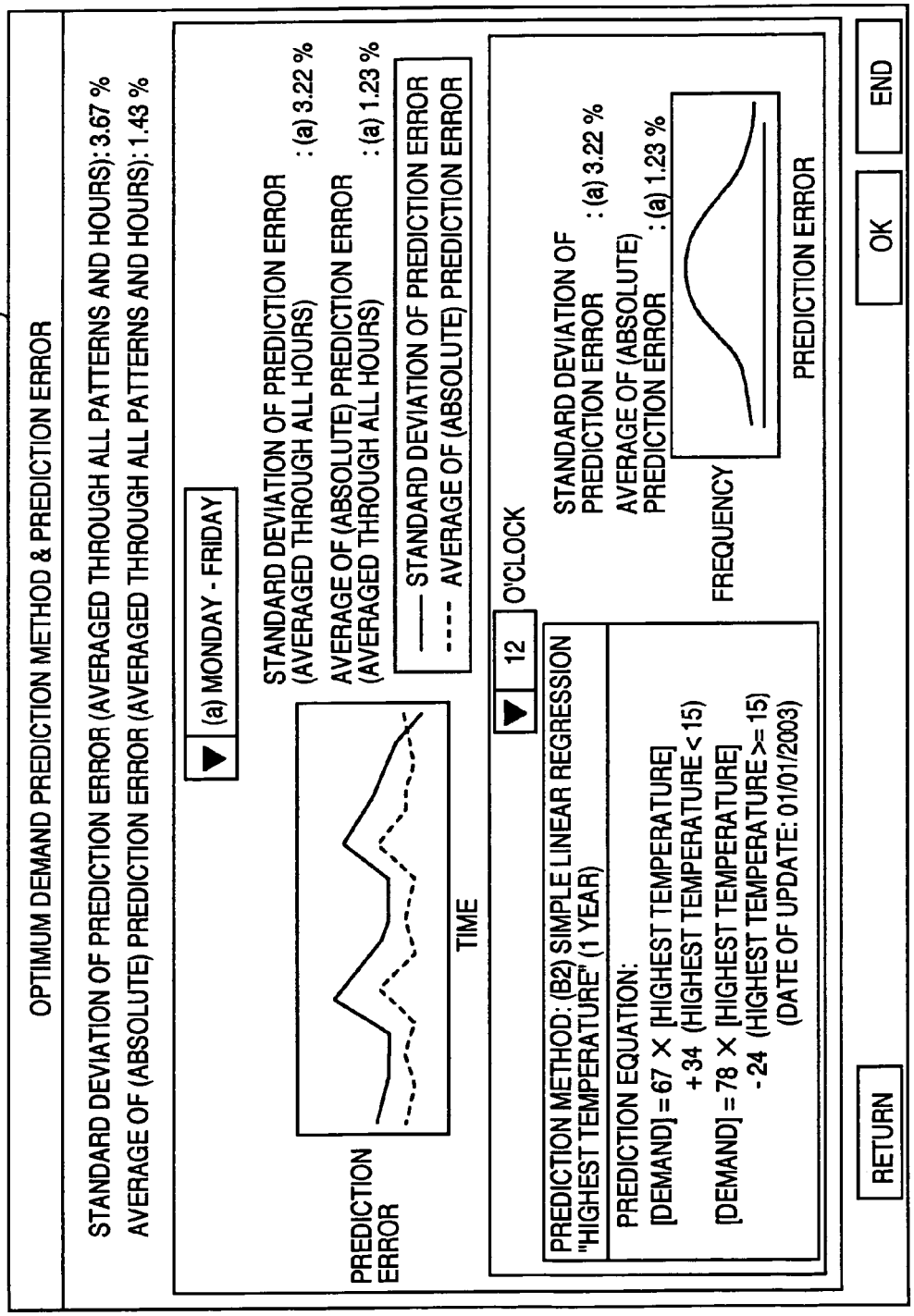
FIG. 10 is a schematic diagram showing an example of an "optimum demand prediction method & prediction error" screen of the system of the embodiment.

FIG. 10 is a schematic diagram showing an "OPTIMUM DEMAND PREDICTION METHOD & PREDICTION ERROR" screen 1001. On this screen 1001, information on the optimum demand prediction model/parameters (selected by the manual selection or the automatic evaluation based on the demand prediction error) and the prediction error is displayed. At the top of the screen, the standard deviation of the prediction error distribution and the average of the (absolute) prediction error as overall values (averaged through all the classified patterns and all the hours) are displayed. Below the overall values, graphs showing the standard deviation of the prediction error distribution and the average of the (absolute) prediction error at each hour are displayed with regard to each classified pattern ("(a) MONDAY-FRIDAY" in the example of FIG. 10). Together with the graphs, the average of the standard deviation of the prediction error taken through all the hours in the classified pattern and the average of the (absolute) prediction error taken through all the hours in the classified pattern are displayed. Further, with regard to each hour (12 o'clock in this example) of the classified pattern ("(a) MONDAY-FRIDAY" in this example), the optimum prediction method, the optimum prediction equation (parameters), the prediction error distribution, the standard deviation of the prediction error distribution, and the average of the (absolute) prediction error are displayed. On this screen 1001, the classified pattern ("(a) MONDAY-FRIDAY" in this example) and the time (12 o'clock in this example) can be switched arbitrarily, by which the user can check the optimum demand prediction method, the optimum demand prediction equation (parameters), etc. of each hour regarding all the classified patterns.

Next, the operation of the system when the menu item "PROFIT ANALYSIS (BY DEMAND DATA LEARNING OF THE PAST)" is selected in the "ANALYSIS MENU" screen 501 of FIG. 5 will be explained. In response to the selection of the "PROFIT ANALYSIS (BY DEMAND DATA LEARNING OF THE PAST)", a screen shown in FIG. 11 is displayed.

Figure 11:
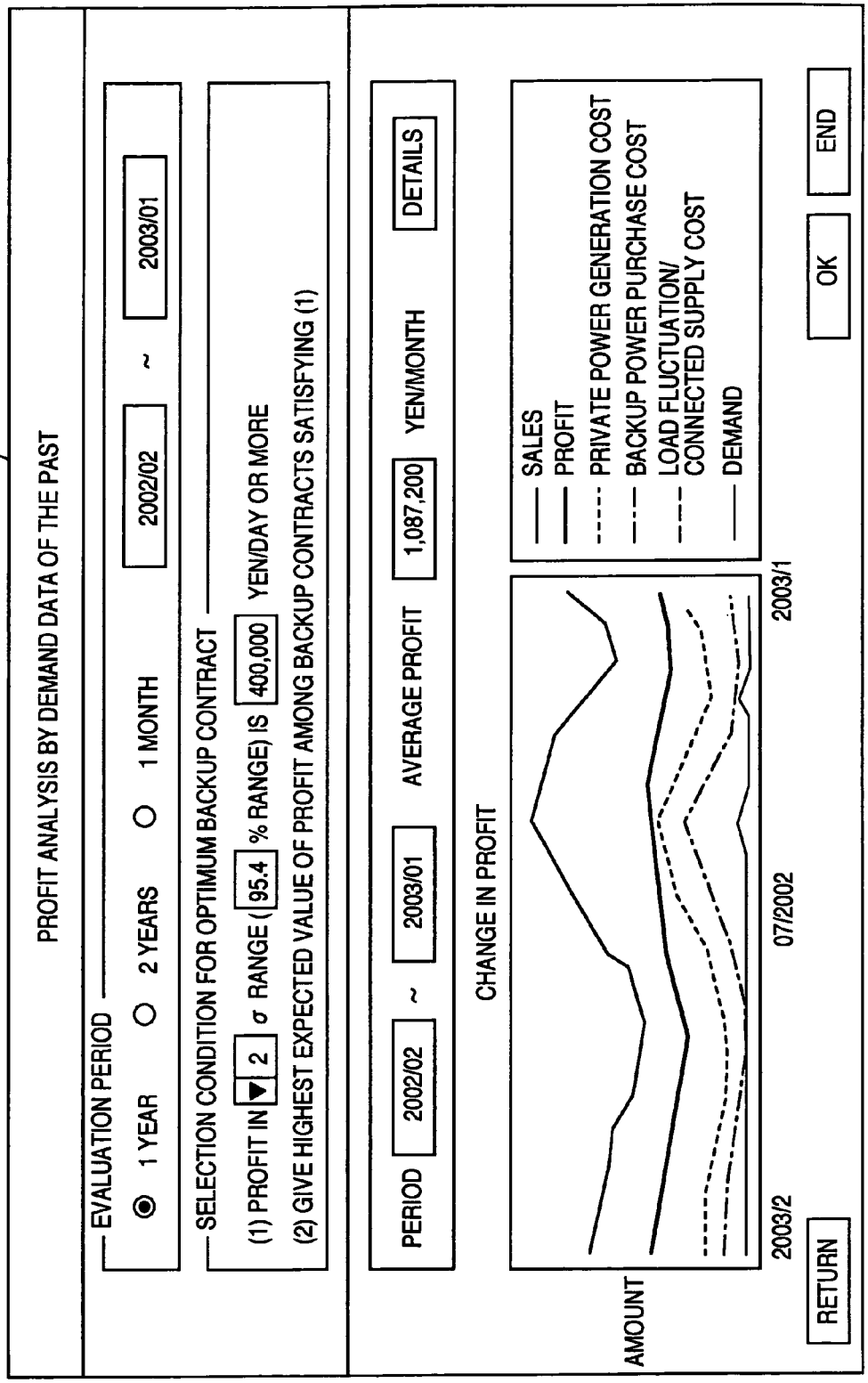
FIG. 11 is a schematic diagram showing an example of a "profit analysis by demand data learning of the past" screen of the system of the embodiment.
Figure 12:
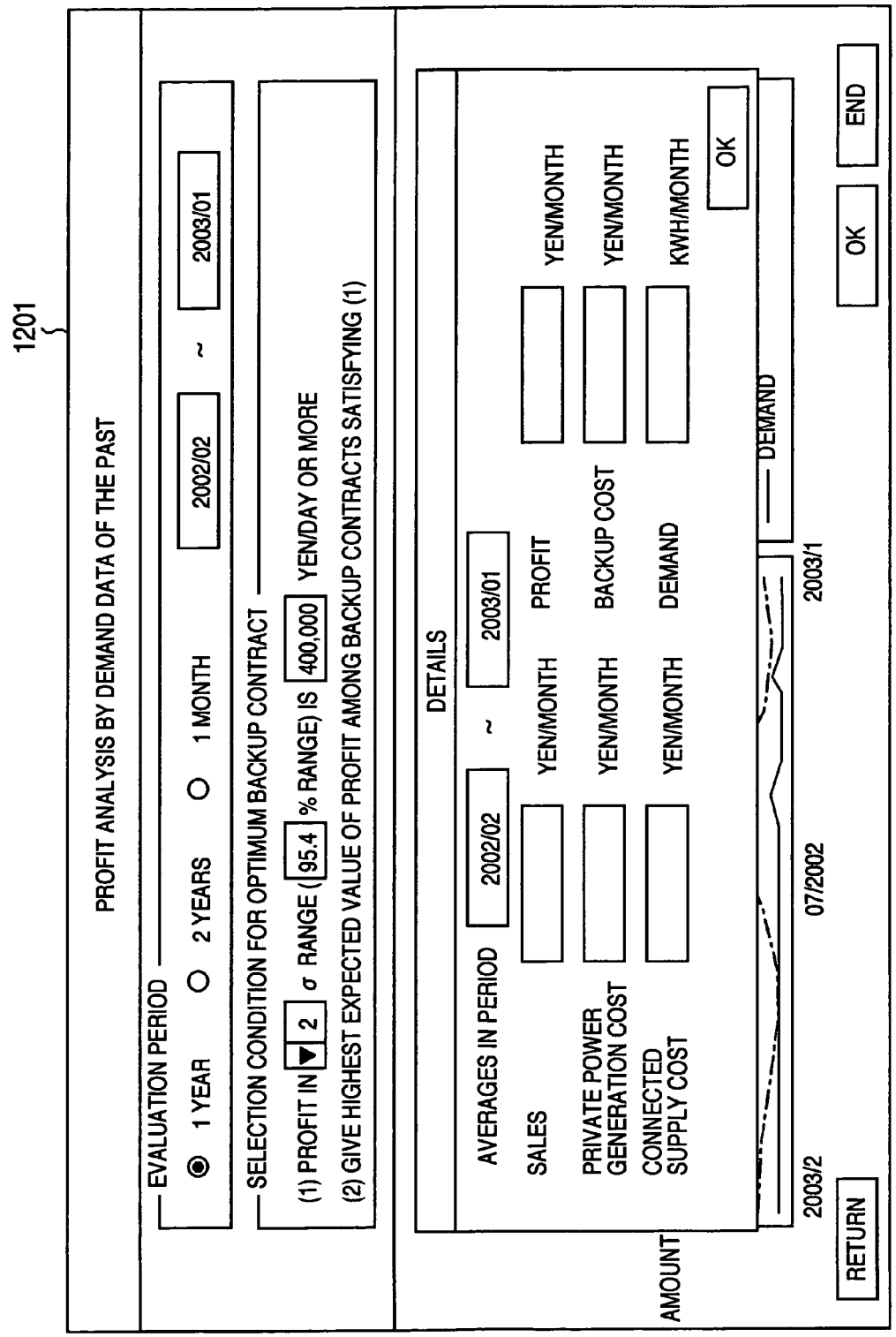
FIG. 12 is a schematic diagram showing another example of a "profit analysis by demand data learning of the past" screen of the system of the embodiment.

FIG. 11 is a schematic diagram showing a "PROFIT ANALYSIS BY DEMAND DATA LEARNING OF THE PAST" screen 1101. First, an evaluation period of the profit analysis and a selection condition for the backup contract are set. The example of FIG. 11 designates that the evaluation should be made by use of data of the past 1 year. As a condition for the backup contract, the profit in the $2\sigma$ range should be at least 400,000 yen/day. Out of the backup contracts satisfying the condition, one that gives the highest expected value of profit is selected as the optimum backup contract. The way of determining the optimum backup contract will be described in detail later referring to FIG. 14 (NEXT DAY PROFIT ANALYSIS). Thereafter, the system calculates how high profit could be obtained with the optimum backup contract (selected by the backup contract optimization technique of the system) by use of data of the past. Since the system has obtained the optimum demand prediction equation (parameters) for each hour, information on the demand prediction of a day in the past made on the previous day (based on the weather information, event information, calendar information, etc.) and information on the actual demand data (track record) of the day can be prepared by use of the demand condition data (the weather/event data, etc.) and the demand data of the past. Therefore, the private power generation cost and the backup power purchase cost that were actually necessary on the day according to the contract optimized at the point of the previous day, the sales, and the income (profit) can be obtained. Thus, various data shown in FIG. 11 (average profit in the past, sales in each month/day, profit in each month/day, private power generation cost in each month/day, backup power purchase cost (and the load fluctuation/connected supply cost included in the backup power purchase cost) in each month/day, demand in each month/day, etc.) can be displayed on the screen 1101. If more detailed information is necessary, the user may press a "DETAILS" button and thereby see a screen 1201 shown in FIG. 12, on which average values of the sales, profit, private power generation cost, backup power purchase cost, load fluctuation/connected supply cost, demand, etc. taken in each month/day can be displayed. The results of the profit analysis using the data of the past are obtained and displayed as above.

Next, the operation of the system when the menu item "NEXT DAY DEMAND PREDICTION" of the "PREDICTION & PROFIT ANALYSIS OF THE NEXT DAY" is selected in the "ANALYSIS MENU" screen 501 of FIG. 5 will be explained. In response to the selection of the "NEXT DAY DEMAND PREDICTION" of the "PREDICTION & PROFIT ANALYSIS OF THE NEXT DAY", a screen shown in FIG. 13 is displayed.

Figure 13:
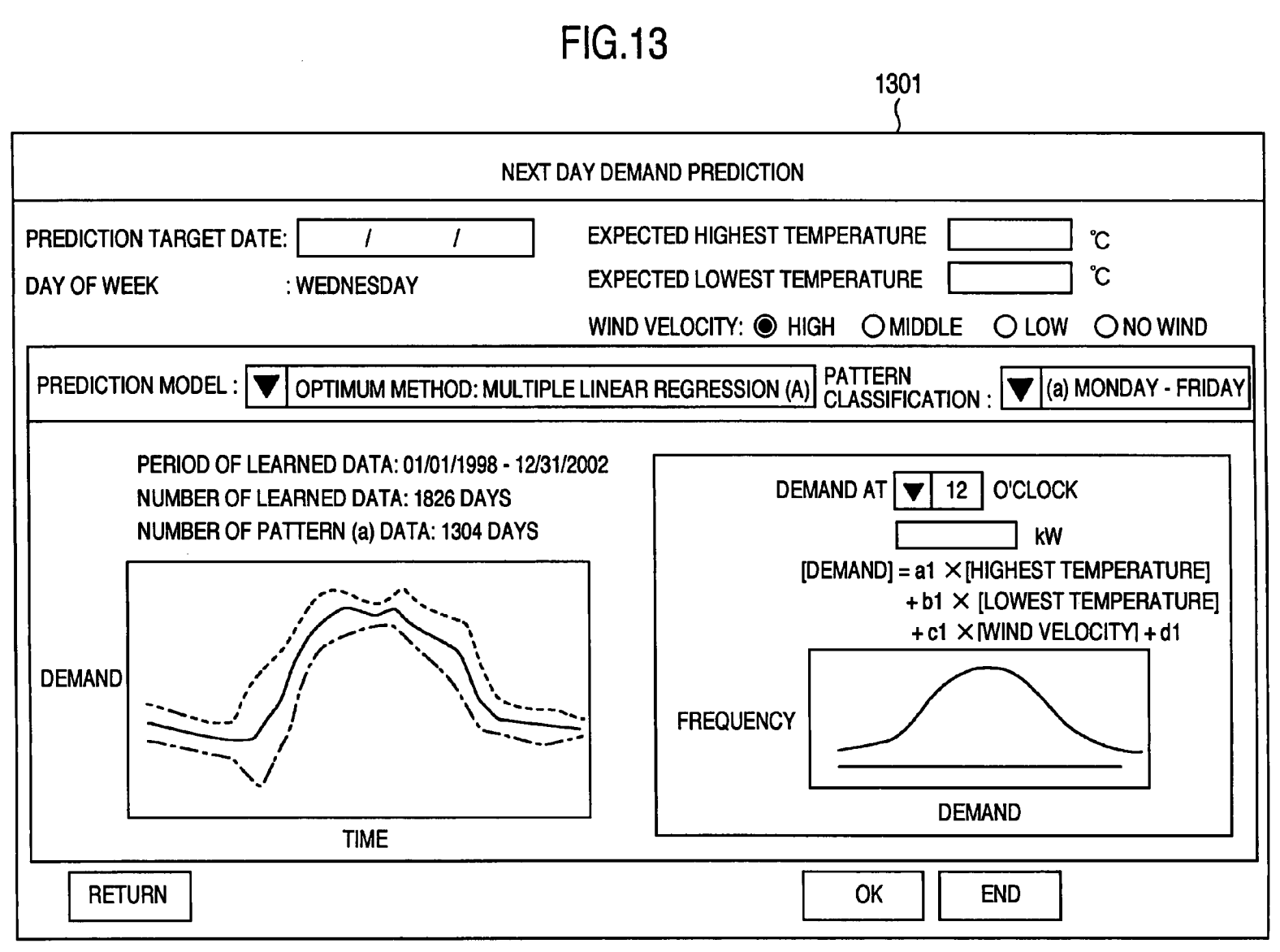

FIG. 13 is a schematic diagram showing a "NEXT DAY DEMAND PREDICTION" screen 1301. On this screen, the user inputs conditions relevant to the demand, such as a date as the target of demand prediction (date of the next day), the day of the week, expected highest temperature and lowest temperature of the day and wind velocity, and then presses the OK button. Then, demand at each hour on the next day is calculated using the optimum demand prediction equation (obtained for the pattern classification and for each hour by the designation on the screen of FIG. 10 in the "OPTIMUM DEMAND PREDICTION METHOD ANALYSIS (BY DEMAND DATA LEARNING OF THE PAST)" menu of FIG. 5) and the result is displayed as a graph shown in FIG. 13. Preferably, demand fluctuation in the data of the past (obtained by adding/subtracting the standard deviation of the prediction error to/from the calculated demand) is also shown in the graph. From the graphic information, the predicted value of the demand and the range of the demand fluctuation at each hour of the next day can be seen. While the demand prediction is carried out for each 1-hour period in this example, demand prediction for each 30-minute period is also popular.

Next, the operation of the system when the menu item "NEXT DAY PROFIT ANALYSIS" of the "PREDICTION & PROFIT ANALYSIS OF THE NEXT DAY" is selected in the "ANALYSIS MENU" screen 501 of FIG. 5 will be explained. In response to the selection of the "NEXT DAY PROFIT ANALYSIS" of the "PREDICTION & PROFIT ANALYSIS OF THE NEXT DAY", a screen like the one shown in FIG. 14 is displayed.

FIG. 14 is a schematic diagram showing a "NEXT DAY PROFIT ANALYSIS" screen 1401. On this screen, profit analysis is made for the result of the next day demand prediction of FIG. 13. At the top of the screen 1401, the date of the next day is indicated. Since the demand prediction result has been obtained for each hour, the time (hour) is designated in a menu at the top center of the screen, by which the demand predicted value and the standard deviation of the demand distribution at the hour are displayed together with a table as shown in FIG. 14. In the table, the vertical axis represents assumed demand and power purchase contract quantity and the horizontal axis represents actual demand and its frequency of occurrence.

The table, showing the relationship between assumed demand (or the power purchase contract quantity) and actual demand (and its frequency), will be explained below in detail. The "assumed demand" on the vertical axis means a demand that is assumed to occur at the hour of the next day. The "power purchase contract quantity" means how much backup power should be purchased by the power purchase contract if the assumed demand occurs necessarily. On the assumption that the demand will necessarily be the assumed demand, it is advisable to let the private power generator (of low cost) cover the assumed demand as much as possible and then make up the shortfall by purchasing backup power from the backup power supplier (electric power company, etc.). Therefore, when the assumed demand has a certain value, the optimum value of the power purchase contract quantity corresponding to the assumed demand is:

[POWER PURCHASE CONTRACT QUANTITY]=
  [ASSUMED DEMAND]−[MAX OUTPUT OF
  PRIVATE POWER GENERATOR]

Referring to the shaded row of the table for example, if we assume that the demand at 12 o'clock on the next day will necessarily be:

[DEMAND PREDICTED VALUE]+2×[DEMAND
  DISTRIBUTION STANDARD DEVIATION], the optimum power purchase contract quantity becomes:

[POWER PURCHASE CONTRACT QUANTITY]=
  [ASSUMED DEMAND]−[MAX OUTPUT OF
  PRIVATE POWER GENERATOR]=[DEMAND
  PREDICTED VALUE]+2×[DEMAND DISTRI-
  BUTION STANDARD DEVIATION]−[MAX
  OUTPUT OF PRIVATE POWER GENERA-
  TOR]

However, even if the above assumption (power purchase contract) is made, actual demand tends to be close to the demand predicted value (probability of a certain demand (or a certain demand range) increases as it gets nearer to the demand predicted value) as shown on the horizontal axis of the table of FIG. 14, in which:

(a) PROBABILITY OF [DEMAND PREDICTED VALUE−2×DEMAND DISTRIBUTION STANDARD DEVIATION] (RANGE): 6.1%

(b) PROBABILITY OF [DEMAND PREDICTED VALUE−DEMAND DISTRIBUTION STANDARD DEVIATION] (RANGE): 24.2%

(c) PROBABILITY OF [DEMAND PREDICTED VALUE] (RANGE): 38.3%

(d) PROBABILITY OF [DEMAND PREDICTED VALUE+DEMAND DISTRIBUTION STANDARD DEVIATION] (RANGE): 24.2%

(e) PROBABILITY OF [DEMAND PREDICTED VALUE+2×DEMAND DISTRIBUTION STANDARD DEVIATION] (RANGE): 6.1%

The probability (percentage) of each actual demand can be obtained from the average and standard deviation of the demand prediction error distribution.

Power sales quantity (quantity of the power selling), power sales price, (private) power generation quantity, (private) power generation cost, (backup) power purchase quantity, and (backup) power purchase cost in case where the actual demand resulted in (c) [DEMAND PREDICTED VALUE] or (d) [DEMAND PREDICTED VALUE+DEMAND DISTRIBUTION STANDARD DEVIATION] under the backup power purchase contract (quantity):

[POWER PURCHASE CONTRACT QUANTITY]=
  [ASSUMED DEMAND]−[MAX OUTPUT OF
  PRIVATE POWER GENERATOR]=[DEMAND
  PREDICTED VALUE]+2×[DEMAND DISTRI-
  BUTION STANDARD DEVIATION]−[MAX
  OUTPUT OF PRIVATE POWER GENERA-
  TOR]

can be obtained from the private power generation cost information and the backup power cost information (+connected supply cost information). Then, the profit in the case where the actual demand resulted in (c) [DEMAND PREDICTED VALUE], for example, can be obtained as:

[PROFIT (c)]=[POWER SALES PRICE]−[PRIVATE
  POWER GENERATION COST]−[BACKUP
  POWER PURCHASE COST]

From the above information, the expected value of the profit under the backup power purchase contract (quantity):

[POWER PURCHASE CONTRACT QUANTITY]=
[ASSUMED DEMAND]−[MAX OUTPUT OF
PRIVATE POWER GENERATOR]=[DEMAND
PREDICTED VALUE]+2×[DEMAND DISTRI-
BUTION STANDARD DEVIATION]−[MAX
OUTPUT OF PRIVATE POWER GENERA-
TOR]

can be obtained as:

[EXPECTED VALUE OF PROFIT]=[PROFIT (a)]×
[PROBABILITY OF PROFIT (a)]+[PROFIT
(b)]×[PROBABILITY OF PROFIT (b)]+
[PROFIT (c)]×[PROBABILITY OF PROFIT
(c)]+[PROFIT (d)]×[PROBABILITY OF
PROFIT (d)]+[PROFIT (e)]×[PROBABILITY
OF PROFIT (e)]

In other words:

[EXPECTED VALUE OF PROFIT]=[PROFIT (a)]×
[PROBABILITY OF ACTUAL DEMAND (a)]+
[PROFIT (b)]×[PROBABILITY OF ACTUAL
DEMAND (b)]+[PROFIT (c)]×[PROBABILITY
OF ACTUAL DEMAND (c)]+[PROFIT (d)]×
[PROBABILITY OF ACTUAL DEMAND (d)]+
[PROFIT (e)]×[PROBABILITY OF ACTUAL
DEMAND (e)]

By calculating the expected value of the profit for each assumed demand (or for each power purchase contract quantity), an optimum assumed demand (or optimum power purchase contract quantity) giving the highest expected value of profit over the backup power purchase cost and private power generation cost can be determined. Incidentally, while only five assumed demands (5 power purchase contract quantities) and five actual demands are shown in the example of FIG. 14, the accuracy of the expected value can naturally be improved by increasing the number of divisions (even if only five are displayed).

As for the display mode of the screen, while only 5 cases:
 (a) PREDICTED VALUE−2SD (Standard Deviation)
 (b) PREDICTED VALUE−SD
 (c) PREDICTED VALUE
 (d) PREDICTED VALUE+SD
 (e) PREDICTED VALUE+2SD are displayed in the table when a vertical/horizontal axis parameter selection button "FIXED" (at the lower right) is selected, a more detailed display mode is enabled by pressing another parameter selection button "FREE", by which a more detailed table (containing more divisions of PREDICTED VALUE−3.0×SD, PREDICTED VALUE−2.9×SD, . . . , PREDICTED VALUE−0.1×SD, PREDICTED VALUE, PREDICTED VALUE+0.1×SD, . . . , PREDICTED VALUE+2.9× SD, and PREDICTED VALUE+3.0×SD, for example) can be seen by use of screen scrolling, etc. In this case, a row of the table (corresponding to an assumed demand or backup power purchase contract quantity) that gives the highest expected value of profit may be displayed with special effects (coloring, displaying first on the screen, etc.) for easy recognition by the user.

In order to examine which backup power purchase contract quantity should be adopted, it is desirable to set the axis parameter to "FREE" (detailed display) and find out a backup power purchase contract quantity that gives the highest expected value of the profit, while checking the profit in the worst case (e.g. worst case in the 2 σ range containing 95% of all the cases) in the row (corresponding to the backup power purchase contract quantity) or whether the worst profit is bearable (acceptable) or not. In case where the worst-case profit in the row (of the backup power purchase contract quantity giving the highest profit expected value) is not acceptable, a backup power purchase contract quantity giving highest profit expected value may be selected from backup power purchase contract quantities having acceptable worst-case profit.

Incidentally, the profit analysis using data of the past (which has been explained referring to FIGS. 11 and 12) can also be carried out by a method like the above method explained referring to FIG. 14, that is, by designating a profit that can be accepted in the worst case (within the 2 σ range containing 95%, for example), assuming that a backup power purchase contract quantity giving highest profit expected value is selected from backup power purchase contract quantities satisfying the worst-case profit condition, and obtaining the profit by use of the selected backup power purchase contract quantity and actual demand data of the past. The assumed demand in the case of the backup power purchase contract quantity (or assumed demand) giving the highest profit expected value determines the demand prediction upward adjustment ratio (quantity) optimized by cost. In this example, the upward adjustment quantity plus the demand predicted value equals the assumed demand. Meanwhile, the "MAX OUTPUT" (MAX OUTPUT OF PRIVATE POWER GENERATOR) and the "CONTRACT QTY." (POWER PURCHASE CONTRACT QUANTITY) in the case of the backup power purchase contract quantity (or assumed demand) giving the highest profit expected value determine the private power generation/power purchase ratio (quantities).

Figure 19:
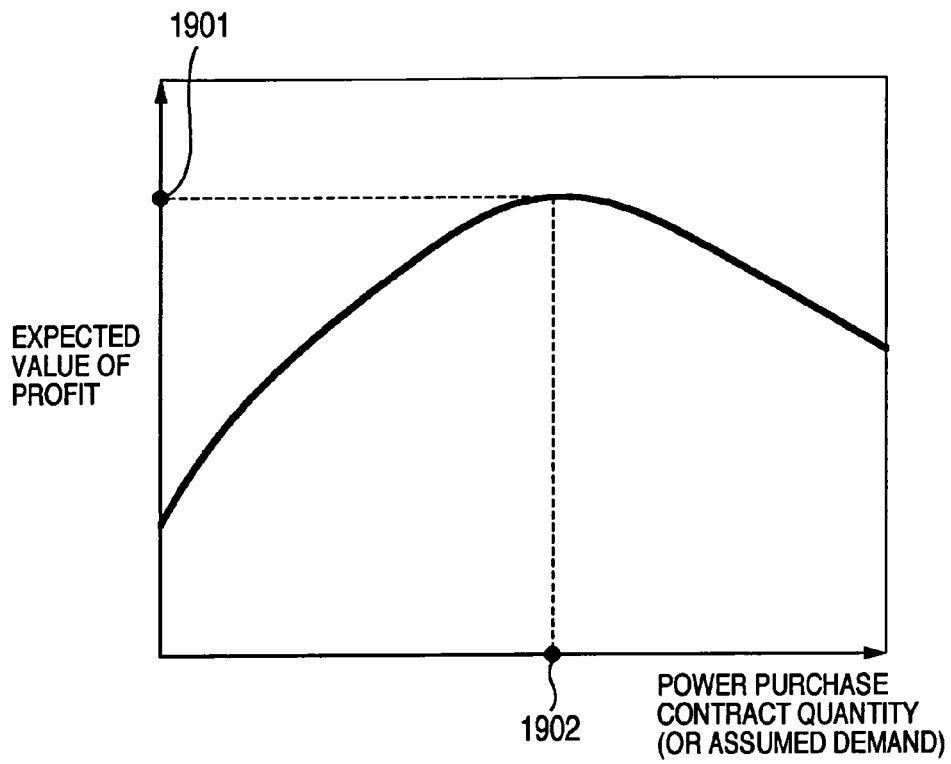
FIG. 19 is a graph showing a next day profit analysis (backup power purchase contract optimization) graph displayed by the system of the embodiment.

As shown in FIG. 19, a graph showing the relationship between the power purchase contract quantity (or assumed demand) and the profit expected value may be displayed. The optimum power purchase contract quantity 1902 (giving the highest profit expected value) and the highest profit expected value 1901 (in the case of the optimum power purchase contract), points showing the values, etc. may be displayed in the graph. By the graphical representation, the relationship between the power purchase contract quantity and the profit expected value becomes more clear.

Further, as shown in FIG. 18, cases in which the penalty has to be paid (same-time same-quantity unachievable, hereinafter simply referred to as "unachievable") and the probability of the may be displayed regarding each assumed demand (backup contract). If the unachievable cases (penalties) occur frequently, the electric power retailer might be instructed by the entity managing the electric power system (e.g. electric power company) to increase the contract demand in the next year, and increasing the contract demand causes increased cost in the next year. The information shown in the table can be used for considering such matters.

Figure 20:
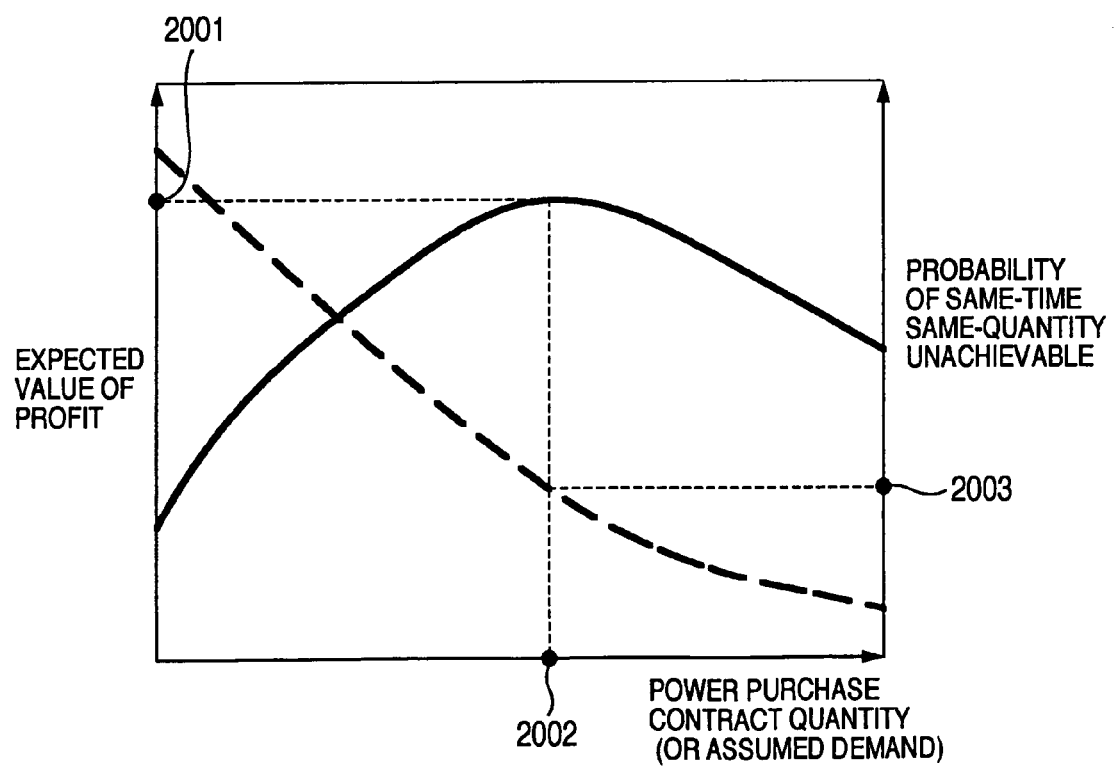
FIG. 20 is a graph showing a next day profit analysis (backup power purchase contract optimization & same-time same-quantity unachievable analysis) graph displayed by the system of the embodiment.

In addition, as shown in FIG. 20, the relationship between the power purchase contract quantity (or assumed demand) and the probability of the unachievable cases may be displayed graphically together with the relationship between the power purchase contract quantity (or assumed demand) and the profit expected value, by which the optimum power purchase contract quantity 2002 (giving the highest profit expected value) and the highest profit expected value 2001 (in the case of the optimum power purchase contract), together with the probability of "unachievable" 2003 in the case, can easily be grasped visually. The graph also makes it possible to select a different power purchase contract that can lessen the probability of "unachievable" (even if its profit expected value is a little lower).

The method for obtaining the demand prediction upward adjustment ratio (quantity) and the private power generation/power purchase ratio (quantities) from the prediction error distribution information to be employed by the demand prediction & backup contract optimization system is not to be restricted to the method of FIG. 14. For example, it is also possible to obtain the demand prediction error distribution from the differences between demand predicted values (predicted from the demand prediction model) and actual demands, obtain profits in cases where the backup contract is changed in various ways by means of simulation, and thereby obtain the optimum values of the demand prediction upward adjustment ratio (quantity) and the private power generation/power purchase ratio (quantities).

The demand prediction & backup contract optimization system (electric power trading support system) in accordance with the present invention is realized as described above.

Embodiment 2

Figure 15:
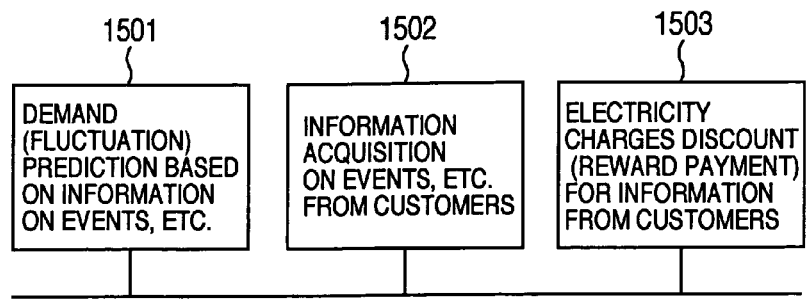
FIG. 15 is a block diagram showing the composition of an electricity charges discount system in accordance with an embodiment of the present invention.

Next, a contrivance for increasing the demand prediction accuracy in order to reduce the backup cost will be explained. In the demand prediction, it is essential to improve the prediction accuracy regarding special days on which special events are held. However, whether a day is a special day or not is generally unknowable without the information disclosure from the customers. For inducing active information disclosure from the customers, it is an effective method to pay the customers rewards for the information disclosure when information relevant to the demand fluctuation (information on events, etc.) is provided by the customers. As a method for paying the reward, the electric power retailer (enjoying the improvement of demand prediction accuracy and the reduction of backup cost thanks to the information disclosure) may give a discount on the electricity charges. Meanwhile, in cases where a service company providing a demand prediction & backup contract optimization service as pay service acquires such information from a customer, the service company may pay the customer a price as a reward for the provision of information leading to the improvement of demand prediction accuracy. A composition for implementing the above schemes is shown in FIG. 15. The composition includes a demand (fluctuation) prediction unit 1501 for predicting the demand (fluctuation) based on information on events, etc., an information acquisition unit 1502 for acquiring the information on events, etc. from the customers, and an electricity charges discount (reward payment) unit 1503 for giving discounts on the electricity charges or paying rewards to the customers for the information supplied from the customers. The aforementioned patent document #1 discloses an embodiment in which the customers predict their own electric power demands and discounts are made on their electricity charges depending on the accuracy of the prediction compared with actual demands. However, the technique of the patent document #1 requires the customers to make the self-prediction in order to get the discount although the self-prediction is difficult for them (department stores, offices, etc.). On the other hand, in the present invention, the owner of the demand prediction & backup contract optimization technology is provided with the demand (fluctuation) prediction unit 1501 for predicting the demand (fluctuation) based on the information on events, etc., by which the customers are allowed to get the electricity charge discount only by providing the information that can be relevant to the demand fluctuation (information on events, etc.). Therefore, the system of the present invention is more practical and convenient for the customers.

Figure 16:
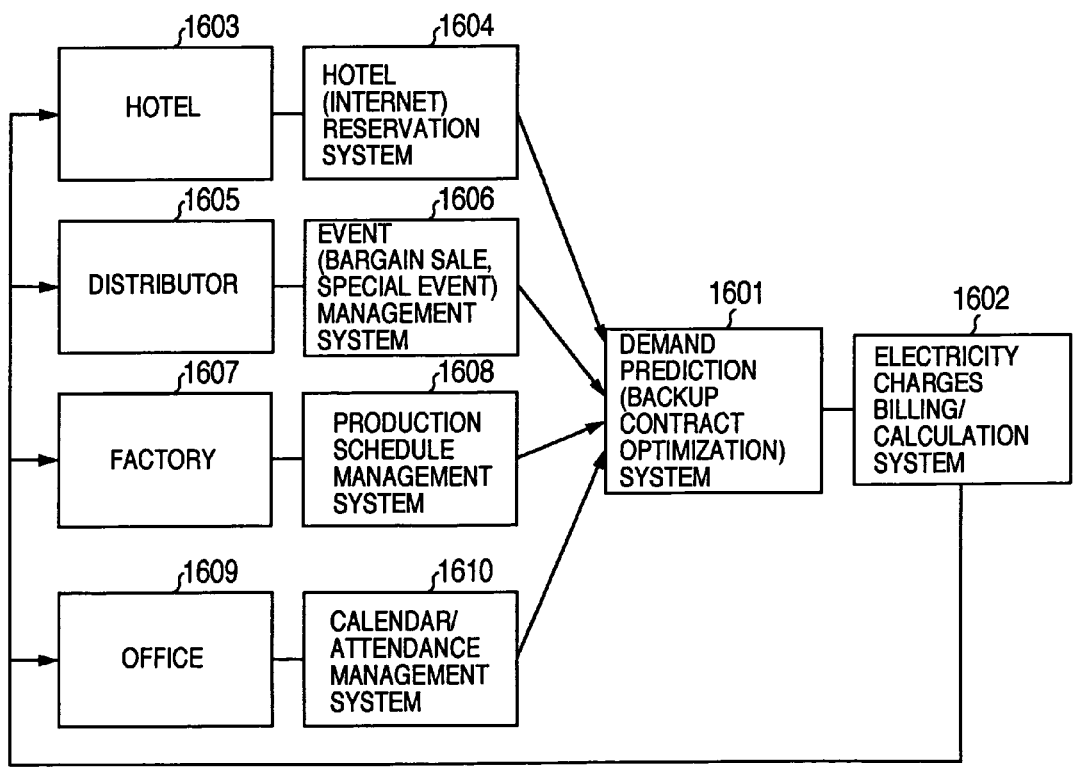
FIG. 16 is a block diagram showing the electricity charges discount system of the embodiment interconnected with other systems.

The demand prediction (backup contract optimization) system including the composition of FIG. 15 may also be operated in collaboration with, for example, a reservation system (internet reservation system) of a hotel so as to acquire the information from the hotel automatically and give the hotel the discounts on electricity charges. It is also possible to acquire the information relevant to the demand fluctuation by interconnecting the demand prediction (backup contract optimization) system with a variety of systems, such as event (bargain sale, special event) management systems of distributors, production management systems of factories and calendar/attendance management systems of offices as shown in FIG. 16, by which the customers are saved from the need of submitting the information on events, etc. by telephone, document, etc. Even without the interconnection of systems, expected effects can be achieved as long as the information on events, etc. can be acquired from the customers, that is, as long as the system includes the unit for acquiring the information on events, etc. from the customers, the unit for predicting the demand (fluctuation) based on the information on events, etc., and the unit for performing the calculation of the electricity charges discount (reward payment) in response to the information on events, etc. supplied from the customers.

Figure 17:
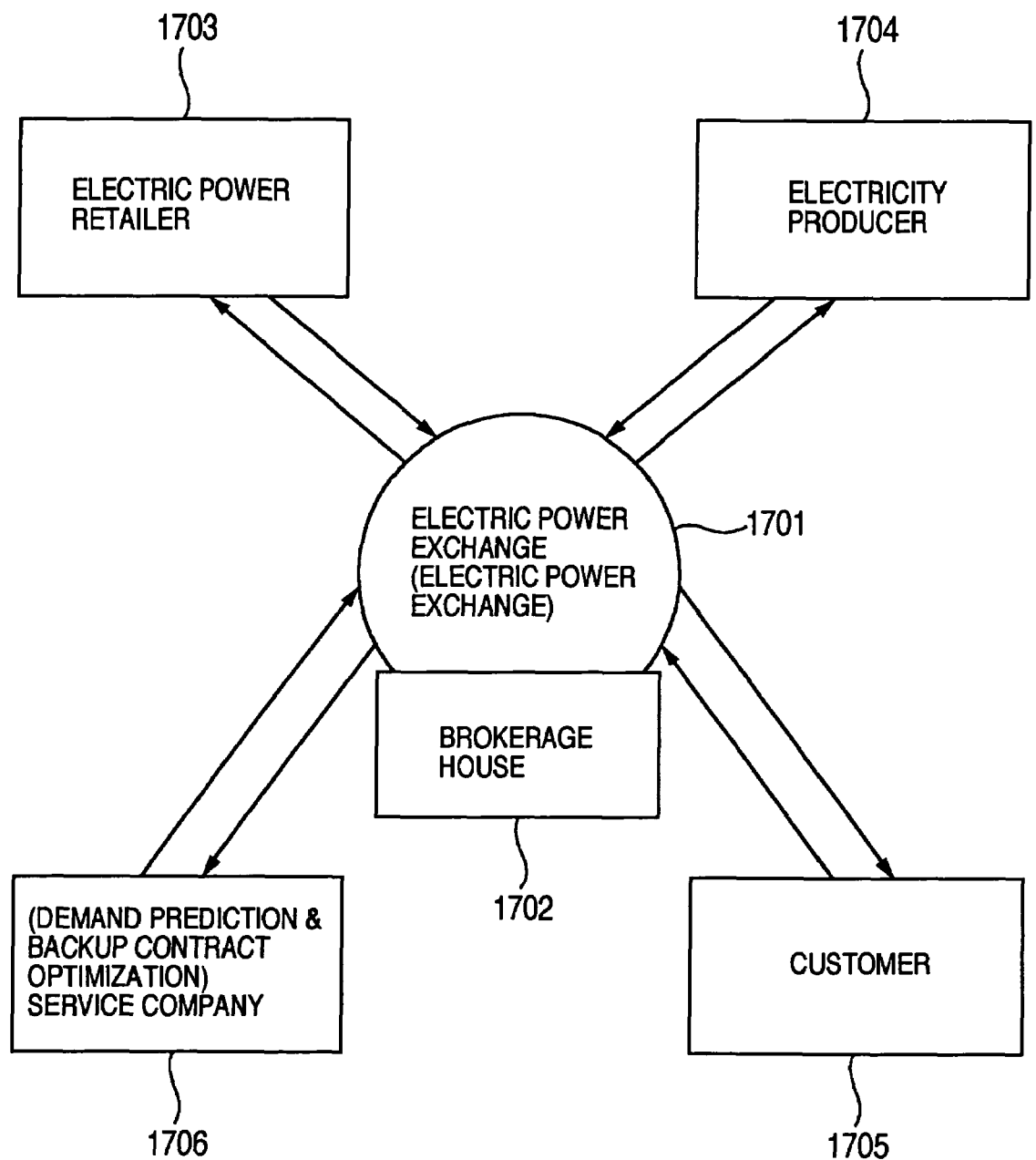
FIG. 17 is a block diagram for explaining various usage patterns of the system of the embodiment in an electric power market.

Next, various usage patterns of the system will be described below. The usage of the system is not restricted to the above usage by the electric power retailers for increasing their profits. FIG. 17 is a block diagram depicting an electric power market after the deregulation of the electric power industry and players (participants) of the market. The system may be employed by a service company 1706 for providing a demand prediction & backup contract optimization service to the electric power market 1701. Further, provision of the demand prediction & backup contract optimization service by a brokerage house 1702 at an electric power exchange 1701 for adding value to its business, employment of the demand prediction & backup contract optimization system by an electric power retailer 1703 for its own business (or provision of the service), employment of the system by an electricity producer 1704 for its own business (or provision of the service), employment of the system by a customer 1705 for itself (or provision of the service), etc. are also possible, by which the reduction of the backup cost, enjoyment of profit from the service, gaining a profit from the electricity charges discount, etc. become possible. The usage of the system is not to be restricted within the country, and the system can be employed in a wide range of electric power markets and circumstances in various countries.

As set forth hereinabove, by the demand prediction & backup contract optimization system (electric power trading support system) in accordance with the present invention, (A) optimum demand prediction (predicted value) upward adjustment ratio (quantity), and (B) optimum self power generation/power purchase ratio (quantities)

for minimizing the cost for the power generation/purchase when electric power is sold by an electric power retailer by use of a private power generator and backup electric power purchased from a backup power suppliers (electric power company, etc.) can be obtained, by which the profits to electric power retailers can be maximized.

Further, the accuracy of the demand prediction regarding special days (days of special demands) can be increased and thereby the backup power purchase cost can be reduced more efficiently.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A system for executing a reservation support of a purchase quantity of a backup power purchased by a power supplier who combines a power generated by a private power generator and a backup power purchased from others and supplies the combined powers to electric utility customers, the system comprising:

at least one memory device storing a database having a plurality of prediction models which predict demand of customers, and storing a demand track record database with past actual demands of the customers:

at least one processor configured for calculating a plurality of each past demand prediction results on the basis of the plurality of prediction models; storing the plurality of each past demand prediction results in a database;

selecting an optimum prediction model by comparing the plurality of each past demand prediction results and the past actual demands of the customers;

storing the optimum prediction model in a database;

calculating future demand prediction and a fluctuation range of the future demand prediction on the basis of the optimum prediction model;

storing the future demand prediction and the fluctuation range of the future demand prediction in a database;

determining a reservation quantity of a backup power so that a summation of three costs, a reservation purchase cost of a backup power to be reserved and purchased, a private power generation cost to be required when the private power generator is operated to generate electric power, and a current day purchase cost of a backup power to be purchased on a current day without a reservation, for the future demand prediction, is minimized, considering the fluctuation range of the future demand prediction and its frequency of occurrence; and electronically communicating the reservation quantity of a backup power.

2. The system according to claim 1, wherein the future is a next day.

3. The system according to claim 1, wherein said at least one processor is configured for receiving information regarding a demand fluctuation of a customer;

storing the information regarding the demand fluctuation of the customer in a database;

calculating a first future demand prediction and a first fluctuation range of the future demand prediction on the basis of the optimum prediction model and the information regarding the demand fluctuation of the customer;

storing the first future demand prediction and the first fluctuation range of the future demand prediction in a database;

determining a first reservation quantity of a backup power, wherein an expectation value of a backup power purchase cost for the first reservation quantity of the backup power is at a minimum, and the expectation value is expected when the reservation quantity of the backup power is set to the first future demand prediction and the first fluctuation range of the future demand prediction;

storing the first reservation quantity of the backup power in a database;

calculating a second future demand prediction and a second fluctuation range of the future demand prediction on the basis of the optimum prediction model without information regarding the demand fluctuation of the customer;

storing the second future demand prediction and the second fluctuation range of the future demand prediction in a database;

determining a second reservation quantity of a backup power, wherein an expectation value of a backup power purchase cost for the second reservation quantity of the backup power is at a minimum, and the expectation value is expected when the reservation quantity of the backup power is set to the second future demand prediction and the second fluctuation range of the future demand prediction;

and storing the second reservation quantity of the backup power in a database, wherein a part of saved costs are given back to the customer when a cost which is required for purchasing the first reservation quantity of the backup power is lower than a cost which is required for purchasing the second reservation quantity of the backup power.

4. A system for executing a reservation support of a purchase quantity of a backup power purchased by a power supplier who combines a power generated by a private power generator and a backup power purchased from others and supplies the combined powers to electric utility customers, the system comprising:

at least one memory device storing a database containing the plurality of each past demand prediction results, and a demand track record database which stores past actual demands of the customers;

at least one processor configured for calculating a plurality of each past demand prediction results on the basis of a plurality of prediction means;

selecting an optimum prediction means by comparing the plurality of each past demand prediction results and the past actual demands of the customers;

calculating a future demand prediction and a fluctuation range of the future demand prediction on the basis of the optimum prediction means;

storing the future demand prediction and the fluctuation range of the future demand prediction;

determining a reservation quantity of a backup power so that a summation of three costs, a reservation purchase cost of a backup power to be reserved and purchased, a private power generation cost to be required when the private power generator is operated to generate electric power, and a current day purchase cost of a backup power to be purchased on a current day without a reservation, for the future demand prediction, is at minimized, considering the fluctuation range of the future demand prediction and its frequency of occurrence; and electronically communicating the reservation quantity of a backup power.

5. The system according to claim 4, wherein the future is a next day.

6. The system according to claim 4, wherein said at least one processor is configured for receiving information regarding a demand fluctuation of a customer;

storing the information regarding the demand fluctuation of the customer in a database;

calculating a first future demand prediction and a first fluctuation range of the future demand prediction on the basis of the optimum prediction means and the information regarding the demand fluctuation of the customer;

storing the first future demand prediction and the first fluctuation range of the future demand prediction in a database;

determining a first reservation quantity of a backup power, wherein an expectation value of a backup power purchase cost for the first reservation quantity of the backup power is at a minimum, and the expectation value is expected when the reservation quantity of the backup power is set to the first future demand prediction and the first fluctuation range of the future demand prediction;

storing the first reservation quantity of the backup power;

a part that calculates a second future demand prediction and a second fluctuation range of the future demand prediction on the basis of the optimum prediction means without information regarding the demand fluctuation of the customer in a database;

storing the second future demand prediction and the second fluctuation range of the future demand prediction in a database;

determining a part that determines a second reservation quantity of a backup power, wherein an expectation value of a backup power purchase cost for the second reservation quantity of the backup power is at a minimum, and the expectation value is expected when the reservation quantity of the backup power is set to the second future demand prediction and the second fluctuation range of the future demand prediction;

storing the second reservation quantity of the backup power, wherein a part of saved costs are given back to the customer when a cost which is required for purchasing the first reservation quantity of the backup power is lower than a cost which is required for purchasing the second reservation quantity of the backup power in a database.

* * * * *